(12) United States Patent
Jung et al.

(10) Patent No.: US 11,716,549 B2
(45) Date of Patent: Aug. 1, 2023

(54) IMAGE SENSOR WITH HIGH CONVERSION GAIN (HCG) MODE AND LOW CONVERSION GAIN (LCG) MODE

(71) Applicant: SAMSUNG ELECTRONICS CO., LTD., Suwon-si (KR)

(72) Inventors: Yunhwan Jung, Hwaseong-si (KR); Hyeokjong Lee, Seoul (KR); Sunyool Kang, Suwon-si (KR); Kyungmin Kim, Seoul (KR); Yunhong Kim, Seoul (KR); Ingyeong Shin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 17/459,045

(22) Filed: Aug. 27, 2021

(65) Prior Publication Data

US 2022/0078362 A1    Mar. 10, 2022

(30) Foreign Application Priority Data

Sep. 9, 2020   (KR) ........................ 10-2020-0115525

(51) Int. Cl.
| | |
|---|---|
| H04N 25/585 | (2023.01) |
| H04N 25/75 | (2023.01) |
| H04N 25/77 | (2023.01) |
| H04N 25/616 | (2023.01) |
| H04N 25/709 | (2023.01) |
| H04N 25/78 | (2023.01) |

(52) U.S. Cl.
CPC ......... *H04N 25/585* (2023.01); *H04N 25/616* (2023.01); *H04N 25/709* (2023.01); *H04N 25/75* (2023.01); *H04N 25/77* (2023.01); *H04N 25/78* (2023.01)

(58) Field of Classification Search
CPC ............. H04N 5/37455; H04N 5/3698; H04N 5/3575; H04N 5/378; H04N 5/3745; H04N 25/585; H04N 25/709; H04N 25/616; H04N 25/75; H04N 25/78; H04N 25/77

See application file for complete search history.

(56) References Cited

U.S. PATENT DOCUMENTS

| | | |
|---|---|---|
| 5,892,540 A | 4/1999 | Kozlowski et al. |
| 5,969,758 A | 10/1999 | Sauer et al. |
| 7,154,078 B2 | 12/2006 | Barna et al. |
| 8,310,581 B2 | 11/2012 | Itakura et al. |

(Continued)

*Primary Examiner* — Nicholas G Giles
(74) *Attorney, Agent, or Firm* — Sughrue Mion, PLLC

(57) ABSTRACT

An image sensor includes a pixel configured to operate in a high conversion gain (HCG) mode and a low conversion gain (LCG) mode during a readout period, and a correlated double sampling (CDS) circuit configured to generate a comparison signal based on a ramp signal and a pixel voltage received from the pixel, wherein the CDS circuit includes a comparator configured to: receive the pixel voltage through a first input node, receive the ramp signal through a second input node based on an LCG reset signal or an LCG image signal being received as the pixel voltage, and receive the ramp signal through a third input node based on an HCG reset signal or an HCG image signal being received as the pixel voltage; and compare the ramp signal to the pixel voltage, and output the comparison signal corresponding to a comparison result.

15 Claims, 24 Drawing Sheets

(56) References Cited

U.S. PATENT DOCUMENTS

| | | |
|---|---|---|
| 8,390,712 B2 | 3/2013 | Xu et al. |
| 8,767,106 B2 | 7/2014 | Ueno |
| 9,106,851 B2 | 8/2015 | Fenigstein et al. |
| 9,288,417 B2 | 3/2016 | Tanaka |
| 9,380,231 B2 | 6/2016 | Yang et al. |
| 9,432,597 B2 | 8/2016 | Guidash et al. |
| 10,237,504 B2 | 3/2019 | Tanaka |
| 10,250,826 B2 | 4/2019 | Mandelli et al. |
| 10,356,351 B1 | 7/2019 | Ebihara et al. |
| 10,431,608 B2 * | 10/2019 | Ebihara .................. H04N 25/75 |
| 10,432,879 B2 | 10/2019 | Chang et al. |
| 10,645,314 B2 * | 5/2020 | Otaka ..................... H04N 25/75 |
| 11,240,448 B2 * | 2/2022 | Mori ....................... H04N 25/75 |
| 2004/0135911 A1 | 7/2004 | Nathan et al. |
| 2014/0028738 A1 | 1/2014 | Nathan et al. |
| 2017/0097317 A1 | 4/2017 | Johnson et al. |
| 2018/0302578 A1 * | 10/2018 | Ebihara ............... H01L 27/1255 |
| 2019/0020832 A1 | 1/2019 | Takane |
| 2019/0149754 A1 * | 5/2019 | Otaka .................. H04N 25/581 |
| | | 348/296 |
| 2020/0204749 A1 * | 6/2020 | Mori .................... H04N 25/772 |
| 2021/0099659 A1 * | 4/2021 | Miyauchi ............. H04N 25/772 |

\* cited by examiner

IMAGE SENSOR WITH HIGH CONVERSION GAIN (HCG) MODE AND LOW CONVERSION GAIN (LCG) MODE

CROSS-REFERENCE TO THE RELATED APPLICATION

This application is based on and claims priority under 35 U.S.C. § 119 to Korean Patent Application No. 10-2020-0115525, filed on Sep. 9, 2020, in the Korean Intellectual Property Office, the disclosure of which is incorporated by reference herein in its entirety.

BACKGROUND

Example embodiments of the disclosure relates to an image sensor, and more particularly, to an image sensor supporting a dual conversion gain, and an operating method thereof.

An image sensor is a device that captures a two-dimensional or three-dimensional image of an object. The image sensor generates an image of an object using a photoelectric conversion element that reacts according to the intensity of light reflected from the object. With the recent development of complementary metal-oxide semiconductor (CMOS) technology, a CMOS image sensor using CMOS is widely used. Recently, in order to increase the dynamic range of an image sensor, a dual conversion gain technology in which one pixel has two conversion gains has been developed.

SUMMARY

One or more example embodiments of the disclosure provide an image sensor capable of processing a pixel signal of a pixel having a dual conversion gain within one frame and reducing a circuit area, and an operating method thereof According to an aspect of the disclosure, there is provided an image sensor including a pixel configured to operate in a high conversion gain (HCG) mode and a low conversion gain (LCG) mode during a readout period, and sequentially output, as a pixel voltage, an LCG reset signal, an HCG reset signal, an HCG image signal, and an LCG image signal; and a correlated double sampling (CDS) circuit configured to generate a comparison signal based on a ramp signal and the pixel voltage received from the pixel, wherein the CDS circuit includes a comparator configured to: receive the pixel voltage through a first input node, receive the ramp signal through a second input node based on the LCG reset signal or the LCG image signal being received as the pixel voltage, and receive the ramp signal through a third input node based on the HCG reset signal or the HCG image signal being received as the pixel voltage; and compare the ramp signal to the pixel voltage, and output the comparison signal corresponding to a comparison result According to an aspect of the disclosure, there is provided an image sensor including a pixel configured to operate in a high conversion gain (HCG) mode and a low conversion gain (LCG) mode during a readout period, and sequentially output, as a pixel voltage, an LCG reset signal, an HCG reset signal, an HCG image signal, and an LCG image signal to a column line; a current source electrically connected to the column line and configured to provide a bias current flowing through a driving transistor of the pixel; and a bias current controller configured to, based on a transition from the LCG mode to the HCG mode of the pixel, adjust the bias current based on the pixel voltage.

According to an aspect of the disclosure, there is provided an image sensor including a pixel configured to operate in a high conversion gain (HCG) mode and a low conversion gain (LCG) mode during a readout period, and sequentially output, as a pixel voltage, an LCG reset signal, an HCG reset signal, an HCG image signal, and an LCG image signal; a correlated double sampling (CDS) circuit configured to compare a ramp signal to the pixel voltage received from the pixel and generate a comparison signal; and a counter circuit configured to generate an HCG pixel value and an LCG pixel value based on the comparison signal received from the CDS circuit and a counting code, the counting code having a code value that increases over time, wherein the counter circuit includes a latch configured to latch the code value of the counting code at a time when a level of the comparison signal transitions, and output the code value as a counting value with respect to the comparison signal; a first memory configured to store a first counting value output from the latch; a second memory configured to store a second counting value output from the latch after the first counting value is output; and a calculator configured to perform calculation on one of a third counting value and a fourth counting value output from the latch and one of the first counting value and the second counting value.

BRIEF DESCRIPTION OF THE DRAWINGS

Example embodiments of the disclosure will be more clearly understood from the following detailed description taken in conjunction with the accompanying drawings, in which.

DETAILED DESCRIPTION

Hereinafter, example embodiments of the disclosure will be described in detail with reference to the accompanying drawings.

Figure 1:
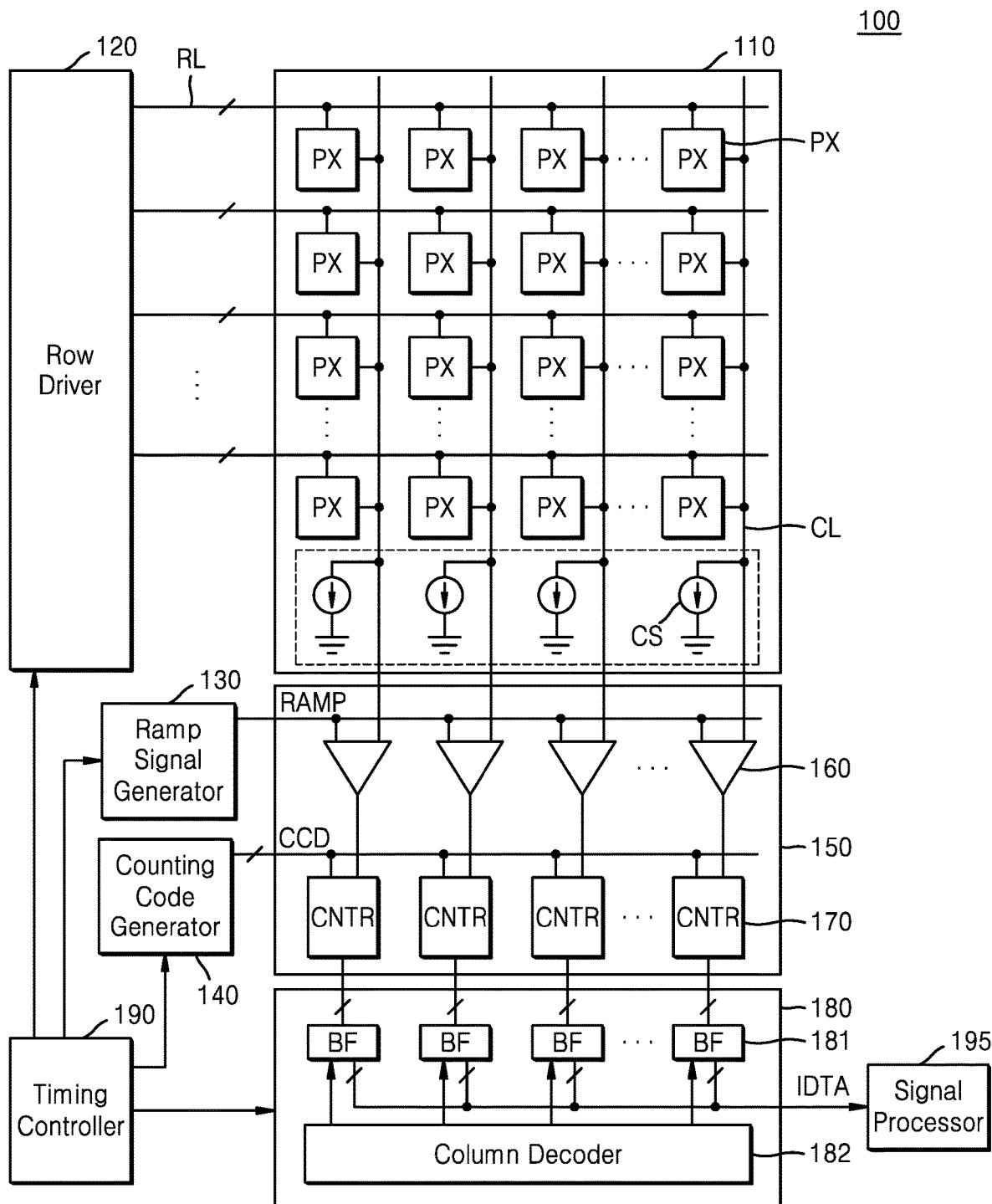
FIG. 1 is a block diagram illustrating an image sensor according to an embodiment of the disclosure.

FIG. 1 is a block diagram illustrating an image sensor 100 according to an embodiment of the disclosure.

The image sensor 100 may be mounted on an electronic device having an image or light sensing function. For example, the image sensor 100 may be mounted on an electronic device such as a camera, a smartphone, a wearable device, an Internet of Things (IoT) device, a personal computer (PC), a personal digital assistant (PDA), a portable multimedia player (PMP), a navigation device, etc. In addition, the image sensor 100 may be mounted on an electronic device provided as a component to vehicles, furniture, manufacturing facilities, doors, and various measuring devices.

The image sensor 100 may include a pixel array 110, a row driver 120, a ramp signal generator 130, a counting code generator 140, an analog-to-digital conversion (ADC) circuit 150, a data output circuit 180, and a timing controller 190. The image sensor 100 may further include a signal processor 195.

The pixel array 110 may include a plurality of row lines RL, a plurality of column lines CL, and a plurality of pixels PX connected to the plurality of row lines RL and the plurality of column lines CL and arranged in a matrix. A current source CS may be connected to each of the plurality of column lines CL.

Each of the plurality of pixels PX may include at least one photoelectric conversion element, and the pixel PX may sense light using the photoelectric conversion element and output an image signal that is an electrical signal according to the sensed light. For example, the photoelectric conversion element may include a photodiode, a photo transistor, a photo gate, or a pinned photodiode.

Each of the plurality of pixels PX may detect light in a specific spectral region. For example, the plurality of pixels PX may include a red pixel that converts light in a red spectrum region into an electric signal, a green pixel that converts light in a green spectrum region into an electric signal, and a blue pixel that converts light in a blue spectrum region into an electric signal. However, the disclosure is not limited thereto, and the plurality of pixels PX may further include a white pixel. As another example, the plurality of pixels PX may include pixels combined in different color configurations, for example, a yellow pixel, a cyan pixel, and a green pixel.

A color filter array that transmits light in a specific spectrum region may be disposed on upper portions of the plurality of pixels PX, and a color sensible by the corresponding pixel may be determined according to a color filter disposed on the upper portion of each of the plurality of pixels PX. However, the disclosure is not limited thereto, and in an embodiment, a specific photoelectric conversion element may convert light in a specific wavelength band into an electric signal according to a level of an electric signal applied to the photoelectric conversion element.

In the pixel array 110 according to an example embodiment, the pixel PX may have a dual conversion gain. The dual conversion gain includes a low conversion gain and a high conversion gain. Here, the conversion gain means a rate at which charges accumulated in a floating diffusion node FD (in FIG. 2) are converted into voltage. Charges generated by the photoelectric conversion element may be transferred to and accumulated in the floating diffusion node FD, and charges accumulated in the floating diffusion node FD may be converted into voltages according to the conversion gain. The conversion gain may vary according to the capacitance of the floating diffusion node FD, and when the capacitance increases, the conversion gain may decrease, and when the capacitance decreases, the conversion gain may increase.

The pixel PX may operate in a low conversion gain (LCG) mode with a high capacitance of the floating diffusion node FD or a high conversion gain (HCG) mode with a low capacitance of the floating diffusion node FD. Even if the charges accumulated in the floating diffusion node FD are the same, the voltage of the floating diffusion node FD in the HCG mode may be higher than the voltage of the floating diffusion node FD in the LCG mode. The configuration of the pixel PX and the operation of the pixel PX according to the conversion gain mode will be described later in detail with reference to FIG. 2.

In first image data generated when the plurality of pixels PX of the pixel array 110 operate in the HCG mode, a dark region may be clearly expressed, and in second image data generated when the plurality of pixels PX of the pixel array 110 operate in the LCG mode, a bright region may be clearly expressed.

In an embodiment, in one frame in which the pixel array 110 is scanned, each of the plurality of pixels PX may continuously operate in the HCG mode and the LCG mode during a corresponding readout period, and accordingly, the first image data corresponding to the HCG mode and the second image data corresponding to the LCG mode may be generated during one frame period. The first image and the second image may be merged to generate a one-shot image having a high dynamic range in which a bright region (a high illuminance region) and a dark region (a low illuminance region) are clearly implemented. As such, the dual conversion gain within one frame may be referred to as an intra-scene dual conversion gain, and hereinafter, the dual conversion gain mentioned in the disclosure means the intra-scene dual conversion gain.

A current source CS may provide a bias current Ib to the pixel PX (e.g., a selected pixel) connected to the corresponding column line CL. Here, the bias current refers to a current output (or applied) from a driving transistor DX of the pixel PX.

In an embodiment, the image sensor 100 may further include a plurality of bias current controllers to increase or reduce the bias current Ib when a conversion mode of the pixel PX changes (e.g., from the LCG mode to the HCG mode or from the HCG mode to the LCG mode) during the readout period, and the plurality of bias current controllers may be respectively connected to the plurality of column lines CL. When the conversion mode of the pixel PX changes, the bias current Ib may vary, and an amount of the bias current Ib may increase or decrease depending on whether the pixel PX operates in the LCG mode or the HCG mode. For example, when the pixel PX operates in the HCG mode, the amount of the bias current Ib may be less than an amount of the bias current Ib provided when the pixel PX operates in the LCG mode.

The row driver 120 may drive the pixel array 110 in units of rows. The row driver 120 may decode a row control signal (e.g., an address signal) received from the timing controller 190, and may select at least one of row lines constituting the pixel array 110 in response to the decoded row control signal. For example, the row driver 120 may generate a selection signal for selecting one of a plurality of rows. Further, the pixel array 110 may output a pixel signal, for example, a pixel voltage, from the row selected according to the selection signal provided from the row driver 120. The pixel signal may include a reset signal and an image signal.

The row driver 120 may transmit control signals for outputting the pixel signal to the pixel array 110, and the pixel PX may output the pixel signal in response to the control signals. In an embodiment, the row driver 120 may generate the control signals for controlling the pixel PX to continuously operate in the HCG mode and the LCG mode during the readout period and provide the control signals to the pixel array 110.

The ramp signal generator 130 may generate a ramp signal (e.g., a ramp voltage) of which a level rises or falls at a predetermined inclination under the control of the timing controller 190. The ramp signal RAMP may be provided to each of a plurality of correlated double sampling (CDS) circuits 160 provided in the ADC circuit 150.

The counting code generator 140 may generate a counting code CCD under the control of the timing controller 190. The counting code CCD may be provided to each of a plurality of counter circuits 170. In an embodiment, the counting code generator 140 may be implemented as a gray code generator. The counting code generator 140 may generate a plurality of code values having a resolution according to a set number of bits as the counting code CCD. For example, when a 10-bit code is set, the counting code generator 140 may generate the counting code CCD including 1024 code values that sequentially increase or decrease.

The ADC circuit 150 may include a plurality of CDS circuits 160 and a plurality of counter circuits 170. The ADC circuit 150 may convert the pixel signal (e.g., a pixel voltage) input from the pixel array 110 into a pixel value that is a digital signal. Each pixel signal received through each of the plurality of column lines CL may be converted into the pixel value that is the digital signal by the CDS circuit 160 and the counter circuit (CNTR) 170.

The CDS circuit 160 may compare the pixel signal received through the column line CL with the ramp signal RAMP and output a comparison result. The CDS circuit 160 may output a comparison signal that transitions from a first level (e.g., logic high) to a second level (e.g., logic low) when the level of the ramp signal RAMP is the same as the level of the pixel signal. A time when the level of the comparison signal transitions may be determined according to the level of the pixel signal.

The CDS circuit 160 may sample and hold the pixel signal provided from the pixel PX according to a CDS method, double-sample a level of specific noise (e.g., a reset signal) and a level according to an image signal, and generate the comparison signal based on a level corresponding to a difference between the levels.

In an embodiment, the CDS circuit 160 may include one or more comparators. The comparator may be implemented, for example, as an operational transconductance amplifier (OTA) (or a differential amplifier). The CDS circuit 160 may include an input stage that receives the ramp signal RAMP and the pixel signal, and the input stage may include a first transistor that receives the ramp signal RAMP, a second transistor that receives the pixel signal and operates when the pixel PX operates in the LCG mode, and a third transistor that receives the pixel signal and operates when the pixel PX operates in the HCG mode. In addition, the CDS circuit 160 may further include a plurality of switches that allow one of the second transistor and the third transistor to operate according to the conversion mode of the pixel PX and perform an auto zero operation according to the conversion mode. Here, reset noise of the pixel signal, an internal offset of the CDS circuit 160, and an offset voltage according to a change in the conversion mode of the pixel PX may be removed by an auto-zero operation.

The counter circuit 170 may count a level transition time of the comparison signal output from the CDS circuit 150 and output a count value. In an embodiment, the counter circuit 170 may include a latch circuit and an operation circuit. The latch circuit may receive the counting code CCD from the counting code generator 140 and the comparison signal from the CDS circuit 160, and latch a code value of the counting code CCD at the time when the level of the comparison signal transitions. The latch circuit may latch a code value corresponding to the reset signal, for example, a reset value, and a code value corresponding to the image signal, for example, an image signal value. The operation circuit may calculate the reset value and the image signal value to generate the image signal value from which the reset level of the pixel PX is removed. The counter circuit 170 may output the image signal value from which the reset level is removed as a pixel value. The counter circuit 170 may include circuits (e.g., the latch circuit, memory, etc.) that store a reset value corresponding to when the pixel PX operates in the LCG mode, such as an LCG reset value, and a reset value corresponding to when the pixel PX operates in the HCG mode, such as an HCG reset value, and a selector that selectively outputs one of the LCG reset value and the HCG reset value, and provides the output reset value to the operation circuit.

In an example embodiment, the image sensor 100 includes the counting code generator 140, and the counter circuit 170 includes a circuit latching the code value of the counting code CCD received from the counting code generator 140, but the disclosure is not limited thereto. In an embodiment, the image sensor 100 does not include a separate counting code generator 140, and the counter circuit 170 may include an up-counter in which count values sequentially increase based on a counting clock signal provided from the timing controller 190 and an operation circuit, an up/down counter, or a bit-wise inversion counter.

The data output circuit 180 may temporarily store the pixel value output from the ADC circuit 150 and then output the pixel value. The data output circuit 180 may include a plurality of column memories (BF) 181 and a column decoder 182. The column memory 181 may store the pixel value received from the counter circuit 170. In an embodiment, each of the plurality of column memories 181 may be provided in the counter circuit 170. A plurality of pixel values stored in the plurality of column memories 181 may be output as image data IDTA under the control of the column decoder 182.

The timing controller 190 may output the control signal to each of the row driver 120, the ramp signal generator 130, the counting code generator 140, the ADC circuit 150, and the data output circuit 180 to control an operation or timing of each of the row driver 120, the ramp signal generator 130, the counting code generator 140, the ADC circuit 150, and the data output circuit 180.

The signal processor 195 may perform noise reduction processing, gain adjustment, waveform shaping processing, interpolation processing, white balance processing, gamma processing, edge enhancement processing, binning, and the like on image data. In an embodiment, as the pixel array 110 operates in the HCG mode and the LCG mode during one frame period, the signal processor 195 may receive first image data according to the HCG mode and second image data according to the LCG mode from the data output circuit 180 and merge the first image data with the second image data to generate an image having a high dynamic range. In an embodiment, the signal processor 195 may be provided in an external processor of the image sensor 100.

Figure 2:
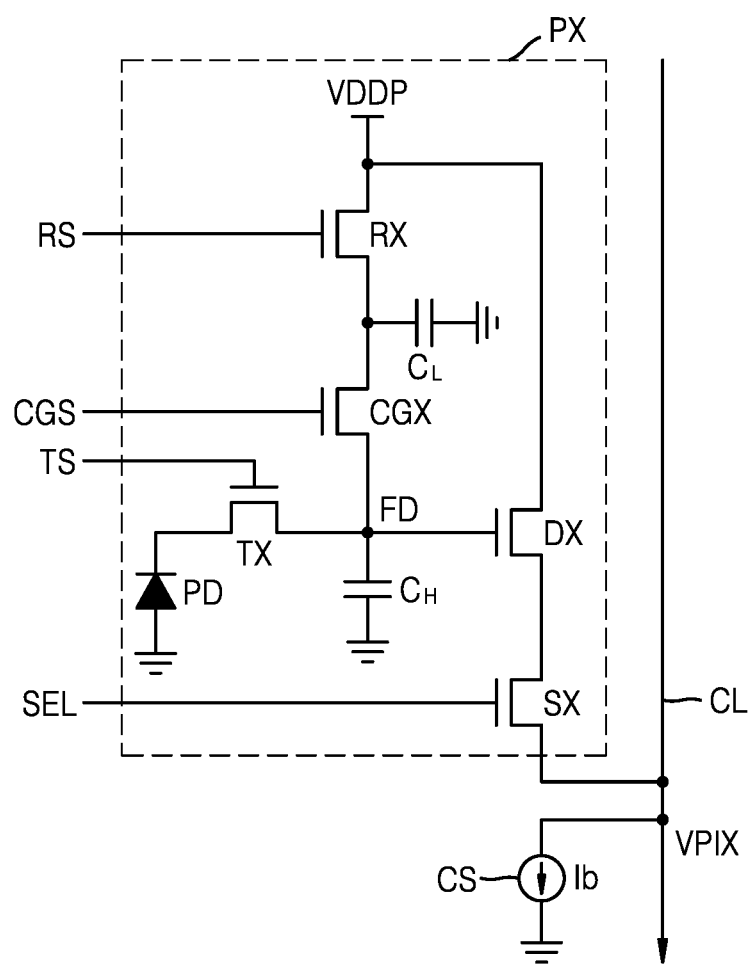
FIG. 2 is a circuit diagram illustrating an implementation example of a pixel according to an embodiment of the disclosure.

FIG. 2 is a circuit diagram illustrating an implementation example of the pixel PX according to an embodiment of the disclosure.

The pixel PX may include a photodiode PD, a plurality of transistors, such as a transfer transistor TX, a reset transistor RX, a driving transistor DX, a selection transistor SX, and a gain control transistor CGX (or a conversion gain control transistor), and a capacitor $C_L$. A capacitor $C_H$ such as a parasitic capacitor may be formed by the floating diffusion node FD. The capacitor $C_L$ may be a passive element having a fixed or variable capacitance, or a parasitic capacitor formed by the source/drain of the gain control transistor CGX, or a parasitic capacitor formed in the other pixel PX that may be connected to the source/drain of the gain control transistor CGX.

The photodiode PD may convert light incident from the outside into an electric signal. The photodiode PD may generate charges according to a light intensity. An amount of charge generated by the photodiode PD varies depending on an image capturing environment (low or high illuminance). For example, the amount of charges generated by the photodiode PD may reach a full well capacity FWC of the photodiode PD in a high illuminance environment while the amount of charges generated by the photodiode PD will not reach the FWC in a low illuminance environment.

The reset transistor RX, transfer transistor TX, and the selection transistor SX, and the gain control transistor CGX may respectively operate in response to control signals provided from the row driver 120, for example, a reset control signal RS, a transmission control signal TS, a selection signal SEL, and a gain control signal CGS.

The reset transistor RX may be turned on in response to the reset control signal RS applied to a gate terminal to reset the floating diffusion node FD based on a pixel power voltage VDDP. At this time, the gain control transistor CGX may be turned on together based on the gain control signal CGS received by the gate terminal, and thus the power supply voltage VDDP may be applied to the floating diffusion node FD and the floating diffusion node FD may be reset.

The transfer transistor TX may be turned on in response to the transfer control signal TS applied to the gate terminal, and may transfer charges generated by the photodiode PD to the floating diffusion node FD. Charges may be accumulated in the floating diffusion node FD. In other words, charges may be accumulated in the capacitor $C_H$ formed by the floating diffusion node FD, or when the gain control transistor CGX is turned on, electric charges may be accumulated in the capacitor CH and the capacitor $C_L$.

Charges accumulated in the floating diffusion node FD may generate a voltage. In other words, charges accumulated in the floating diffusion node FD may be converted into the voltage. The conversion gain (for example, a unit of the conversion gain may be uV/e) may be determined by the capacitance of the floating diffusion node FD, and may be inversely proportional to the size of the capacitance. When the capacitance of the floating diffusion node FD increases, the conversion gain may decrease, and when the capacitance decreases, the conversion gain may increase.

The driving transistor DX may operate as a source follower based on the bias current Ib generated by the current source CS connected to the column line CL, and may output a voltage corresponding to the voltage of the floating diffusion node FD as a pixel voltage VPIX through the selection transistor SX.

The selection transistor SX may select the pixel PX. The selection transistor SX may be turned on in response to the selection signal SEL applied to the gate terminal to output the pixel voltage VPIX (or current) output from the driving transistor DX to the column line CL. The pixel voltage VPIX may be provided to the ADC circuit 150 (of FIG. 1) through the column line CL.

The gain control transistor CGX may be turned on or off based on the gain control signal CGS received at the gate terminal. When the gain control transistor CGX is turned off, the floating diffusion node FD may have capacitance by the capacitor $C_H$, and when the gain control transistor CGX is turned on, the capacitor $C_L$ may be connected to the floating diffusion node FD, and the floating diffusion node FD may have capacitance by the capacitor $C_H$ and the capacitor $C_L$, and thus the capacitance may increase. The conversion gain when the gain control transistor CX is in a turn-off state may be higher than the conversion gain when the gain control transistor CGX is in a turn-on state. A mode in which the gain control transistor CX is in the turn-off state may be referred to as an HCG mode, and a mode in which the gain control transistor CX is in the turn-on state may be referred to as an LCG mode.

As described above, the pixel PX may operate in one of the HCG mode and the LCG mode according to the turn-on or turn-off state of the gain control transistor CGX. In the HCG mode, because the conversion gain of the pixel PX may increase, the gain of circuits (for example, the ADC circuit 150) that process the pixel voltage VPIX output from the pixel PX may decrease relatively. Accordingly, a signal to noise ratio (SNR) of the image sensor (100 in FIG. 1) may increase, and thus the minimum sensible light amount may be lowered, and the low light amount sensing performance of the image sensor 100 may be improved. In the LCG mode, because the capacitance of the floating diffusion node FD of the pixel PX is large, the FWC may increase. Accordingly, the high light amount sensing performance of the image sensor 100 may be improved.

As described above, because the pixel PX provides the dual conversion gain to sense a low light amount and a high light amount, the dynamic range of the image sensor 100 may expand (or increase). In addition, as described above with reference to FIG. 1, the pixel PX may continuously operate in the HCG mode and the LCG mode during the readout period, and the image sensor 100, for example, the signal processor 195 (in FIG. 1), may merge a first image according to the HCG mode with a second image according to the LCG mode to generate an image having a high dynamic range.

Figure 3:
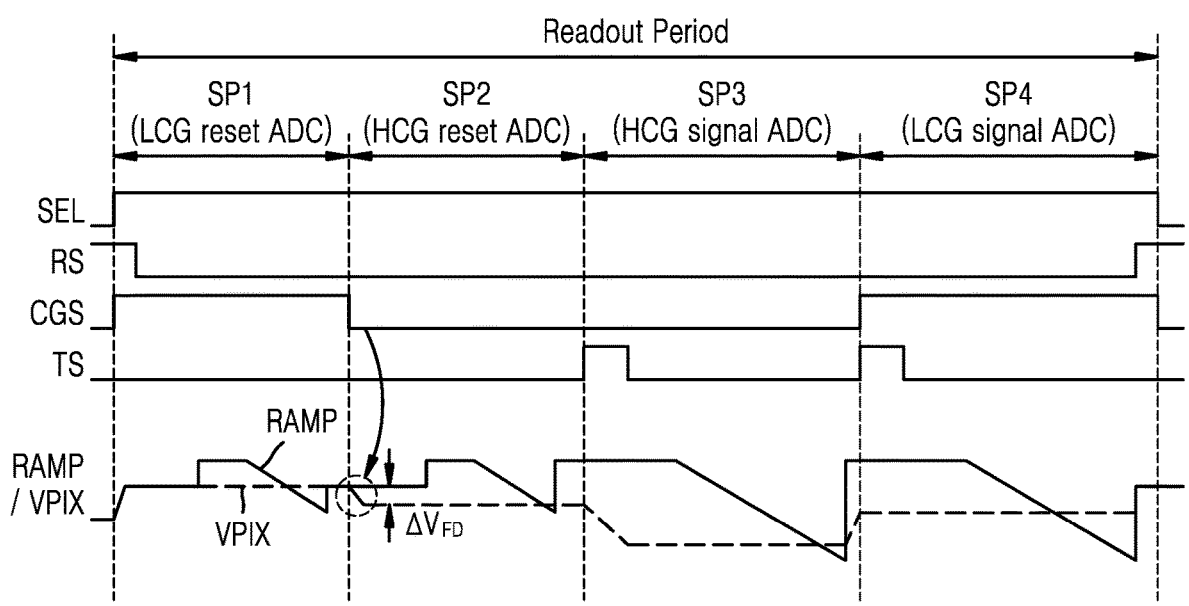
FIG. 3 is a timing diagram of an image sensor according to an embodiment of the disclosure.

FIG. 3 is a timing diagram of the image sensor 100 according to an embodiment of the disclosure. FIG. 3 is a timing diagram of the image sensor 100 when a pixel signal is read from the pixel PX of FIG. 2.

The plurality of pixel voltages VPIX (or a plurality of currents) may be read from the plurality of pixels PX arranged in at least one row of the pixel array 110 (in FIG. 1) during one readout period (or a horizontal period). In other words, each of the plurality of pixels PX may output the pixel voltage VPIX during the readout period, and the pixel voltage VPIX may be analog-to-digital converted by the corresponding CDS circuit 160 and counter circuit 170 of the ADC circuit 150.

Referring to FIGS. 2 and 3 together, the selection signal SEL may be at an active level, for example, logic high, during the readout period, and the selection transistor SX may be turned on in response to the selection signal SEL such that the pixel PX may be connected to the column line CL. Here, an active level of a signal means a level at which a transistor to which the signal is applied may be turned on. In the disclosure, it is assumed that logic high is the active level and logic low is an inactive level.

A readout period may be divided into first to fourth sub-periods SP1 to SP4 according to a pixel signal output from the pixel PX. According to the gain control signal CGS, the pixel PX may operate in an LCG mode during the first and fourth sub-periods SP1 and SP4, and the pixel PX may operate in an HCG mode during the second and third sub-periods SP2 and SP3. As described above, the pixel PX may have a dual conversion gain.

During the first sub-period SP1, a reset signal corresponding to a reset level of the pixel PX (for example, the voltage of the reset floating diffusion node FD) may be read, and because the pixel PX operates in the LCG mode in the first sub-period SP1, an LCG reset signal indicating the reset level in the LCG mode may be read.

In response to active levels of the reset control signal RS and the gain control signal CGS, the reset transistor RX and the gain control transistor CGX may be turned on and the floating diffusion node FD may be reset. An LCG reset signal corresponding to the reset voltage of the floating diffusion node FD may be output as the pixel voltage VPIX, and the LCG reset signal may be analog-to-digital converted. When the CDS circuit 160 (in FIG. 1) compares the ramp signal RAMP to the pixel voltage VPIX and outputs a comparison result as a comparison signal, the counter circuit 170 (in FIG. 1) may latch a counting code received based on the comparison signal to generate a count value corresponding to the LCG reset signal, e.g., the LCG reset value.

During the second sub-period SP2, a reset signal corresponding to the reset level of the pixel PX may be read, and because the pixel PX operates in the HCG mode in the second sub-period SP2, the HCG reset signal indicating the reset level in the HCG mode may be read.

As the gain control signal CGS transitions to the inactive level, such as logic low, the gain control transistor CGX may be turned off, and the pixel PX may be switched to the HCG mode. As the gain control signal CGS transitions from logic high to logic low, the coupling capacitance of the floating diffusion node FD may change, and accordingly, the voltage of the floating diffusion node FD may change. For example, a coupling capacitor may be formed between the row line RL to which the gain control signal CGS is applied and the floating diffusion node FD. As the gain control signal CGS changes, the coupling capacitance may change. Accordingly, an offset voltage $\Delta V_{FD}$ according to an amount of change in the coupling capacitance may be added to the voltage of the floating diffusion node FD. In this case, the offset voltage $\Delta V_{FD}$ may be a positive voltage or a negative voltage, and as shown in FIG. 3, the pixel voltage VPIX may increase or decrease according to the offset voltage $\Delta V_{FD}$ of the floating diffusion node FD. In other words, the pixel voltage VPIX of the second sub-period SP2, that is, the HCG reset signal, may have a value obtained by adding the offset voltage $\Delta V_{FD}$ of the floating diffusion node FD to the LCG reset signal of the first sub-period SP1.

During the third sub-period SP3, the pixel PX may operate in the HCG mode, and an HCG image signal corresponding to a signal level of the pixel PX may be read. As the transfer control signal TS transitions to the active level, for example, logic high, charges generated by the photodiode PD may be transferred to and stored in the floating diffusion node FD. The driving transistor DX may output an image signal based on the voltage of the floating diffusion node FD according to the amount of charges transferred from the photodiode PD. Because the pixel PX operates in the HCG mode, the HCG image signal may be output as the pixel voltage VPIX and may be analog-to-digital converted.

During the fourth sub-period SP4, the pixel PX may operate in the LCG mode, and an LCG image signal corresponding to the signal level of the pixel PX may be read. As the gain control signal CGS transitions to the active level, such as logic high, the gain control transistor CGX may be turned on, and the pixel PX may be switched to the LCG mode. In this case, the coupling capacitance of the floating diffusion node FD may change again. In other words, the coupling capacitance of the floating diffusion node FD may be the same as that of the first sub-period SP1, and the offset voltage $\Delta V_{FD}$ added to the voltage of the floating diffusion node FD during the second sub-period SP2 may be removed. As the transfer control signal TS transitions to the active level, e.g., logic high, the remaining charges generated in the photodiode PD (e.g., the remaining charges that are not transmitted to the floating diffusion node FD during the third sub-period SP3) may be transferred to and stored in the floating diffusion node FD. The voltage of the floating diffusion node FD may change according to a change in the conversion gain and an amount of charges additionally transferred to the photodiode PD during the fourth sub-period SP4, and the LCG image signal corresponding to the voltage of the floating diffusion node FD may be output as the pixel voltage VPIX and may be analog-to-digital converted.

The reset level of the pixel PX may be different for each of the plurality of pixels PX, and may be different over time. In addition, a conversion circuit that converts the pixel voltage VPIX into a digital value, for example, the CDS circuit 160 and the counter circuit 170, may have different offsets between columns. Accordingly, a deviation may occur between read image signals, that is, pixel values.

The image sensor 100 may first read the reset signal during a readout period, and then read the image signal using a CDS method based on the reset signal, subtract the reset signal from the read image signal, and generate an actual image signal, that is, a pixel value indicating the amount of charges generated by the photodiode PD. Accordingly, a deviation between pixel values may be reduced. When an intra-scene dual conversion gain is provided, a reset signal and an image signal respectively corresponding to the HCG mode and the LCG mode may be read from the pixel PX during the readout period, and actual image signals with respect to the HCG mode and the LCG mode, for example, an HCG pixel value and an LCG pixel value may be generated.

To this end, as described above, during the first sub-period SP1, the pixel PX may operate in the LCG mode, and the LCG reset signal may be read (referred to as LCG reset ADC); during the second sub-period SP2, the pixel PX may operate in the HCG mode, and the HCG reset signal may be read (referred to as HCG reset ADC); during the third sub-period SP3, the HCG image signal (e.g., the HCG signal voltage) may be read (referred to as HCG signal ADC); and during the fourth sub-period SP4, the pixel PX may operate in the LCG mode, and the LCG image signal (e.g., the LCG signal voltage) may be read (referred to as LCG signal ADC). As described above, the LCG reset signal, the HCG reset signal, the HCG image signal, and the LCG image signal may be sequentially read during the readout period, and such a read method may be referred to as a reset-reset-signal-signal (RRSS) read method.

As described above, the HCG reset level and the LCG reset level may be different. Accordingly, in order to read the HCG image signal and the LCG image signal according to the CDS method, the CDS circuit 160 may perform an auto zero operation during the first sub-period SP1 and the second sub-period SP2 to sample and hold the LCG reset signal and the HCG reset signal, and thereafter, sample the HCG image signal based on the HCG reset signal during the third sub-period SP3, and sample the LCG image signal based on the LCG reset signal during the fourth sub-period SP4.

In addition, to subtract a counting value of the HCG reset signal and a counting value of the LCG reset signal from the counting value of the read HCG image signal and a counting value of the read LCG image signal, respectively, the counter circuit 170 may store the counting value of the LCG reset signal and the counting value of the HCG reset signal and selectively use the counting value of the HCG reset signal and the counting value of the LCG reset signal during the third sub-period SP3 in which the HCG image signal is read and the fourth sub-period SP4 in which the LCG image signal is read.

In another embodiment, the image sensor 100 may adjust the HCG reset level to be the same as the LCG reset level. In an embodiment, the image sensor 100 may increase or decrease the bias current Ib of the current source CS such that an HCG reset level is the same as an LCG reset level based on the pixel voltage VPIX output from the pixel PX when the LCG mode changes to the HCG mode during the second sub-period SP2.

According to an example embodiment, even if a conversion mode of the pixel PX is switched between the LCG mode and the HCG mode during the readout period in order to provide a dual conversion gain, to generate high-quality image data, a CDS circuit, a bias current controller and a counter circuit according to an embodiment of the disclosure described below may be provided.

Figure 4:
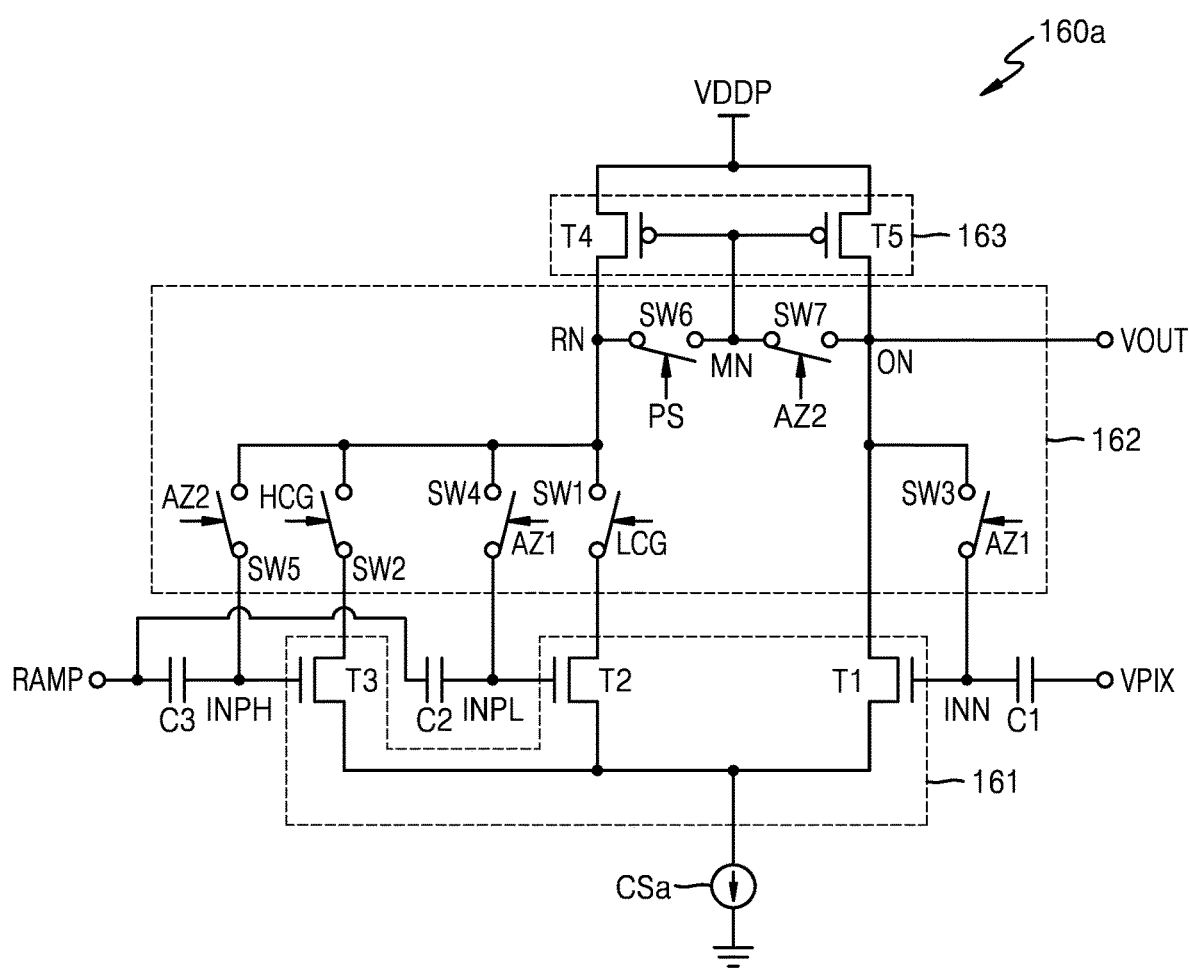
FIG. 4 is a circuit diagram illustrating a correlated double sampling (CDS) circuit according to an embodiment of the disclosure.

FIG. 4 is a circuit diagram illustrating a CDS circuit 160a according to an embodiment of the disclosure.

Referring to FIG. 4, the CDS circuit 160a may include an input stage 161, a switching stage 162, an output stage 163, a current source CSa, and first to third capacitors C1, C2, and C3. In FIG. 4, the CDS circuit 160a includes a comparator, such as an OTA circuit, and the comparator includes the current source CSa, the input stage 161 and the output stage 163. However, the CDS circuit 160 is not limited thereto, and the CDS circuit 160a may further include a circuit (e.g., an OTA circuit, a buffer, an inverter, an amplifier, etc.) connected to the output stage 163.

The current source CSa may provide a bias current that determines an operating point of the CDS circuit 160a. The input stage 161 may include first to third transistors T1, T2, and T3 and the first to third capacitors C1, C2, and C3, and one end of each of the first to third transistors T1, T2, and T3 may be connected to the current source CSa. The first to third transistors T1, T2, and T3 may be NMOS transistors.

Ends of the first to third capacitors C1, C2, and C3 may be respectively connected to gate terminals of the first to third transistors T1, T2, and T3, that is, first to third input nodes INN, INPL, INPH.

The pixel voltage VPIX may be applied to the other end of the first capacitor C1, and the first capacitor C1 may DC block the pixel voltage VPIX, sample and hold an AC signal of the pixel voltage VPIX, and provide the AC signal to the first transistor T1. The first capacitor C1 may be used to correct an offset of the CDS circuit 160a and a change in a reset level of the pixel voltage VPIX.

The ramp signal RAMP may be applied to the other end of the second capacitor C2, and the second capacitor C2 may DC block the ramp signal RAMP to provide an AC signal of the ramp signal RAMP to the second transistor T2. The second capacitor C2 may be used to correct the offset of the CDS circuit 160a and a level change of the ramp signal VPIX. Further, the second capacitor C2 may hold the LCG reset level.

The ramp signal RAMP may be applied to the other end of the third capacitor C3, and the third capacitor C3 may DC block the ramp signal RAMP to provide the AC signal of the ramp signal RAMP to the third transistor T3. The third capacitor C3 may be used to correct the offset of the CDS circuit 160a and the level change of the ramp signal VPIX. Also, the third capacitor C3 may hold the HCG reset level.

The output stage 163 may be implement as a current mirror circuit including the fourth transistor T4 and the fifth transistor T5. The fourth transistor T4 and the fifth transistor T5 may be PMOS transistors. The power voltage VDDP may be applied to one ends of the fourth transistor T4 and the fifth transistor T5. The other end of the fourth transistor T4 may be connected to a comparison node RN, and the other end of the fifth transistor T5 may be connected to an output node ON. The gate terminals of the fourth and fifth transistors T4 and T5 may be connected to a middle node MN, and the gate terminals of the fourth and fifth transistors T4 and T5 may be connected to the comparison node RN or the output node ON.

The switching stage 162 may include first to seventh switches SW1 to SW7. Each of the first to seventh switches SW1 to SW7 may be implemented as NMOS or PMOS.

The first switch SW1 may be connected between the second transistor T2 and the comparison node RN and may be turned on or off in response to an LCG switching signal. The first switch SW1 may be turned on in response to an active level of the LCG switching signal indicating an LCG mode, and may connect the second transistor T2 to the comparison node RN. Accordingly, the second transistor T2 may operate in the LCG mode.

The second switch SW2 may be connected between the third transistor T3 and the comparison node RN, and may be turned on or off in response to an HCG switching signal. The second switch SW2 may be turned on in response to an active level of the HCG switching signal indicating an HCG mode, and may connect the third transistor T3 to the comparison node RN. Accordingly, the third transistor T3 may operate in the HCG mode.

The third switch SW3 may be connected between the first input node INN and the output node ON, and may be turned on or off in response to an AZ1 switching signal. The third switch SW3 may be turned on in response to an active level of the AZ1 switching signal indicating a first auto zero period to connect the first input node INN to the output node ON.

The fourth switch SW4 may be connected between the second input node INPL and the comparison node RN, and may be turned on or off in response to the AZ1 switching signal. The fourth switch SW4 may be turned on in response to an active level of the AZ1 switching signal indicating the first auto zero period to connect the second input node INPL to the comparison node RN.

The fifth switch SW5 may be connected between the fourth input node INPH and the comparison node RN, and may be turned on or off in response to an AZ2 switching signal. The fifth switch SW5 may be turned on in response to an active level of the AZ2 switching signal indicating a second auto zero period to connect the third input node INPH to the comparison node RN.

The sixth switch SW6 may be connected between the comparison node RN and the gate terminals of the fourth transistor T4 and the fifth transistor T5, and may be turned on or off in response to a PS switching signal. The seventh switch SW7 may be connected between the output node ON and the gate terminals of the fourth transistor T4 and the fifth transistor T5, and may be turned on or off in response to the AZ2 switching signal. The PS switching signal and the AZ2 switching signal may have opposite phases. In other words, the PS switching signal may be a complementary signal of the AZ2 switching signal. Accordingly, the sixth switch SW6 and the seventh switch SW7 may operate complementarily. The PS switching signal may have an active level during the readout period, but the PS switching signal may have an inactive level during the second auto zero period in which the AZ2 switching signal has an active level. Accordingly, the sixth switch SW6 may connect the gate terminals of the fourth transistor T4 and the fifth transistor T5 to the comparison node RN during the readout period, but the seventh switch SW7 may connect the gate terminals of the fourth transistor T4 and the fifth transistor T5 to the output node ON during the second auto zero period.

Figure 5:
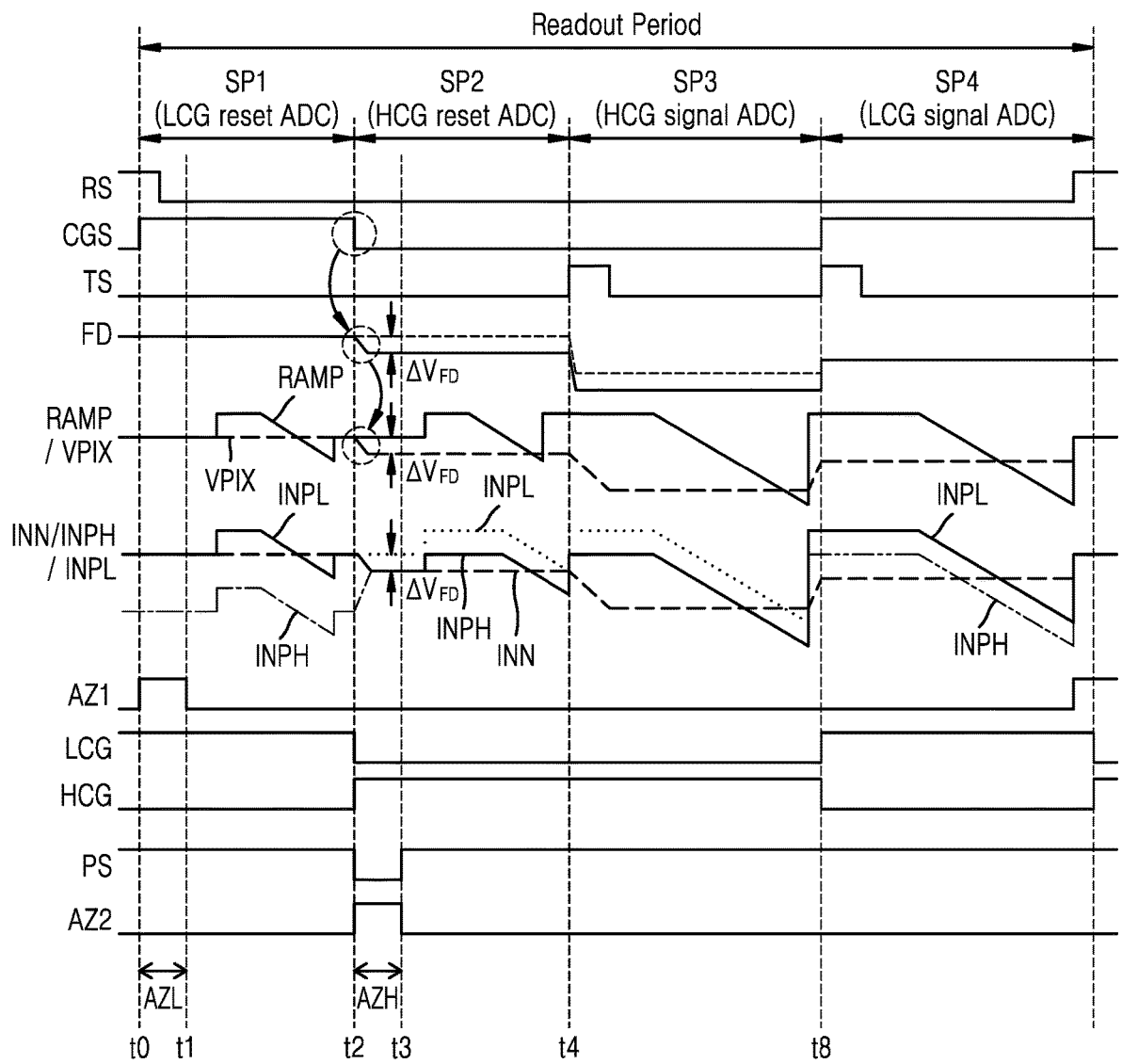
FIG. 5 is a timing diagram illustrating switching signals applied to the CDS circuit of FIG. 4 and voltages of input nodes.

FIG. 5 is a timing diagram illustrating switching signals applied to the CDS circuit 160a of FIG. 4 and voltages of input nodes, and FIGS. 6A to 9 illustrate operations of the CDS circuit 160a according to the switching signals applied to the CDS circuit.

For convenience of description, control signals provided to the pixel PX (of FIG. 2) and the voltage of the floating diffusion node FD are shown together. The first to fourth sub-periods SP1 to SP4 of a readout period, the reset signal RS, the gain control signal CGS, and the transmission control signal TS are described above with reference to FIG. 3, and thus detailed descriptions thereof will be omitted.

Figure 6A:
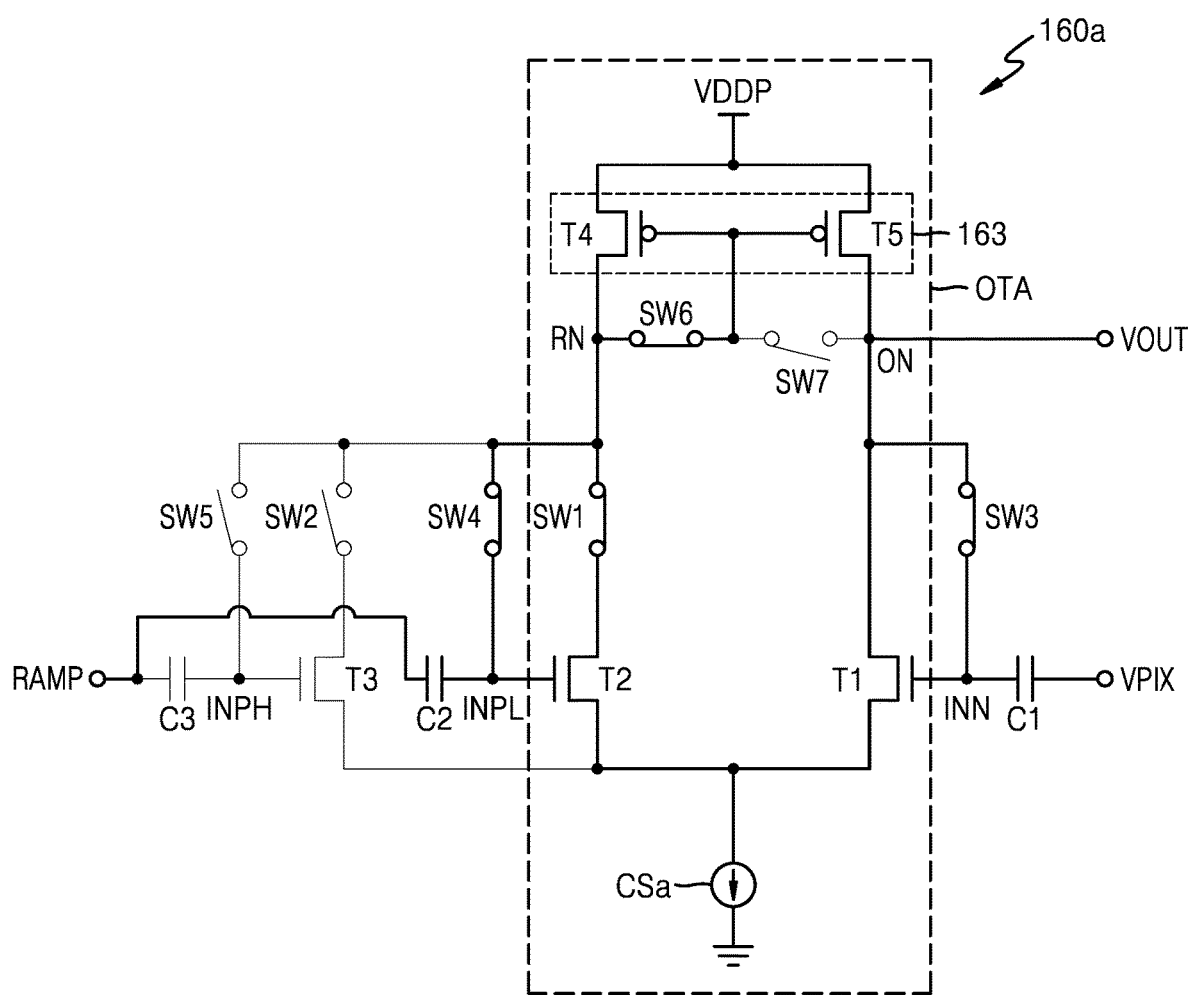
FIGS. 6A to 9 illustrate operations of a CDS circuit according to switching signals applied to the CDS circuit.

Referring to FIG. 5, LCG reset ADC may be performed during the first sub-period SP1. An LCG switching signal and a PS switching signal may have an active level, and an HCG switching signal and an AZ2 switching signal may have an inactive level. An interval from a time t0 to a time t1 may be a first auto-zero interval AZL. The AZ1 switching signal may have the active level. Accordingly, the CDS circuit 160a may perform a first auto-zero operation during the first auto-zero interval AZL, and the first switch SW1, the third switch SW3, the fourth switch SW4, and the sixth switch SW6 may be turned on as shown in FIG. 6A. The first transistor T1, the second transistor T2, and the output stage 163 may constitute an OTA, the first input node INN and the output node ON may be connected, the second input node INPL and the comparison node RN may be connected to each other, and the gate terminals of the fourth transistor T4 and the fifth transistor T5 may be connected to the comparison node RN.

Figure 6B:
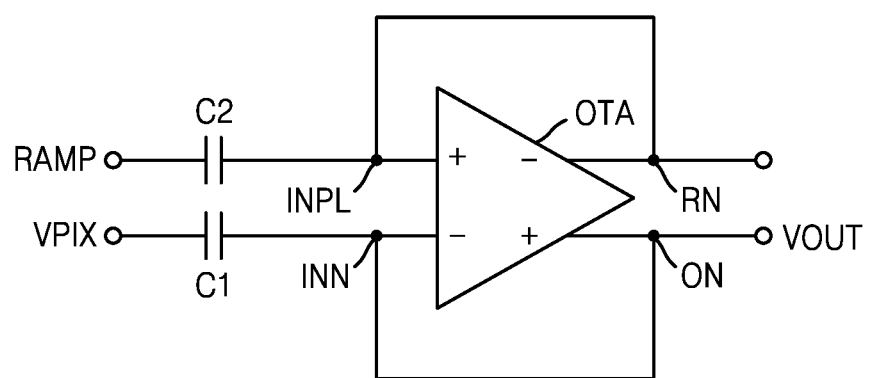

As shown in FIG. 6B, in the first auto-zero interval AZL, the first input node INN may be a negative input terminal of the OTA, the second input node INPL may be a positive input terminal of the OTA, the comparison node RN may be a negative output terminal of the OTA, and the output node ON may be a positive output terminal of the OTA.

The pixel voltage VPIX, that is, an LCG reset signal, may be applied to the first input node INN through the first capacitor C1, and the ramp signal RAMP may be applied to the second input node INPL through the second capacitor C2. As the first input node INN and the output node ON are connected to each other, and the second input node INPL and the comparison node RN are connected to each other, the voltages of the first input node INN and the second input node INPL, the comparison node RN, and the output node ON may be equal to a first auto-zero voltage level, and the reset noise of the pixel voltage VPIX and the offset of the CDS circuit 160a may be removed. Here, the first auto-zero voltage level may be determined according to a level of the LCG reset signal, applied to the CDS circuit 160a as the pixel voltage VPIX, a level of the ramp signal RAMP, and the offset of the CDS circuit 160a.

Figure 7:
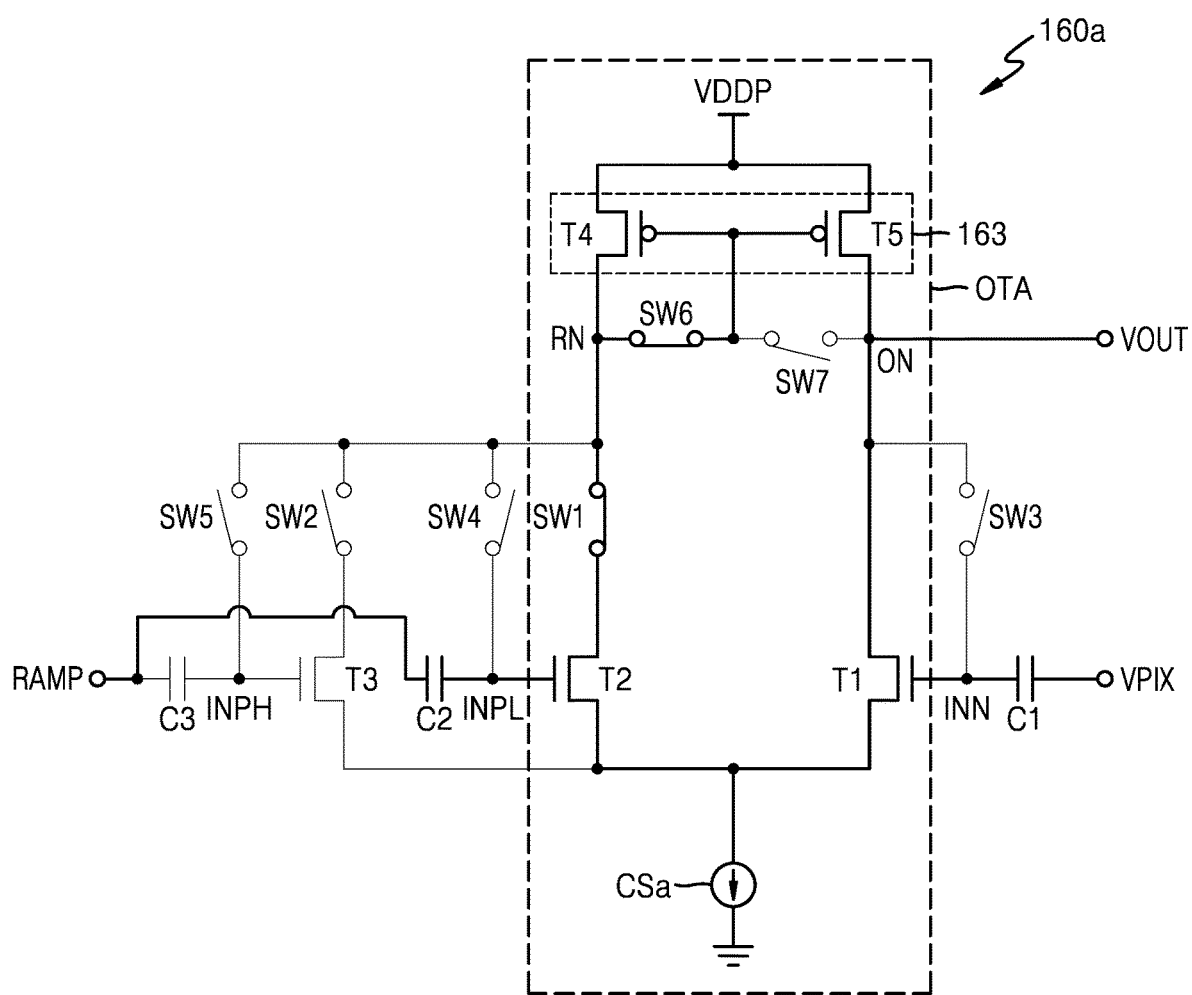

Thereafter, an AZ1 switching signal may transition to an inactive level at the time t1, and, as illustrated in FIG. 7, the third switch SW3 and the fourth switch SW4 may be turned off. The first input node INN and the output node ON may be disconnected from each other, and the second input node INPL and the comparison node RN may be disconnected from each other. Accordingly, sampling of signals applied to the first input node INN and the second input node INPL, the LCG reset signal, and the ramp voltage RAMP may be ended, and the first auto-zero voltage level in the LCG mode may be stored in the second capacitor C2.

An LCG reset signal may be read during an LCG reset signal determination period from the time t1 to a time t2. The ramp signal RAMP may fall at a predetermined inclination, and the voltage of the second input node INPL may fall at a predetermined inclination according to the ramp signal RAMP. The CDS circuit 160a may output a comparison signal indicating a time from when the ramp signal RAMP starts to fall to a time when the voltage of the first input node INN is the same as the voltage of the second input node INPL.

Figure 8A:
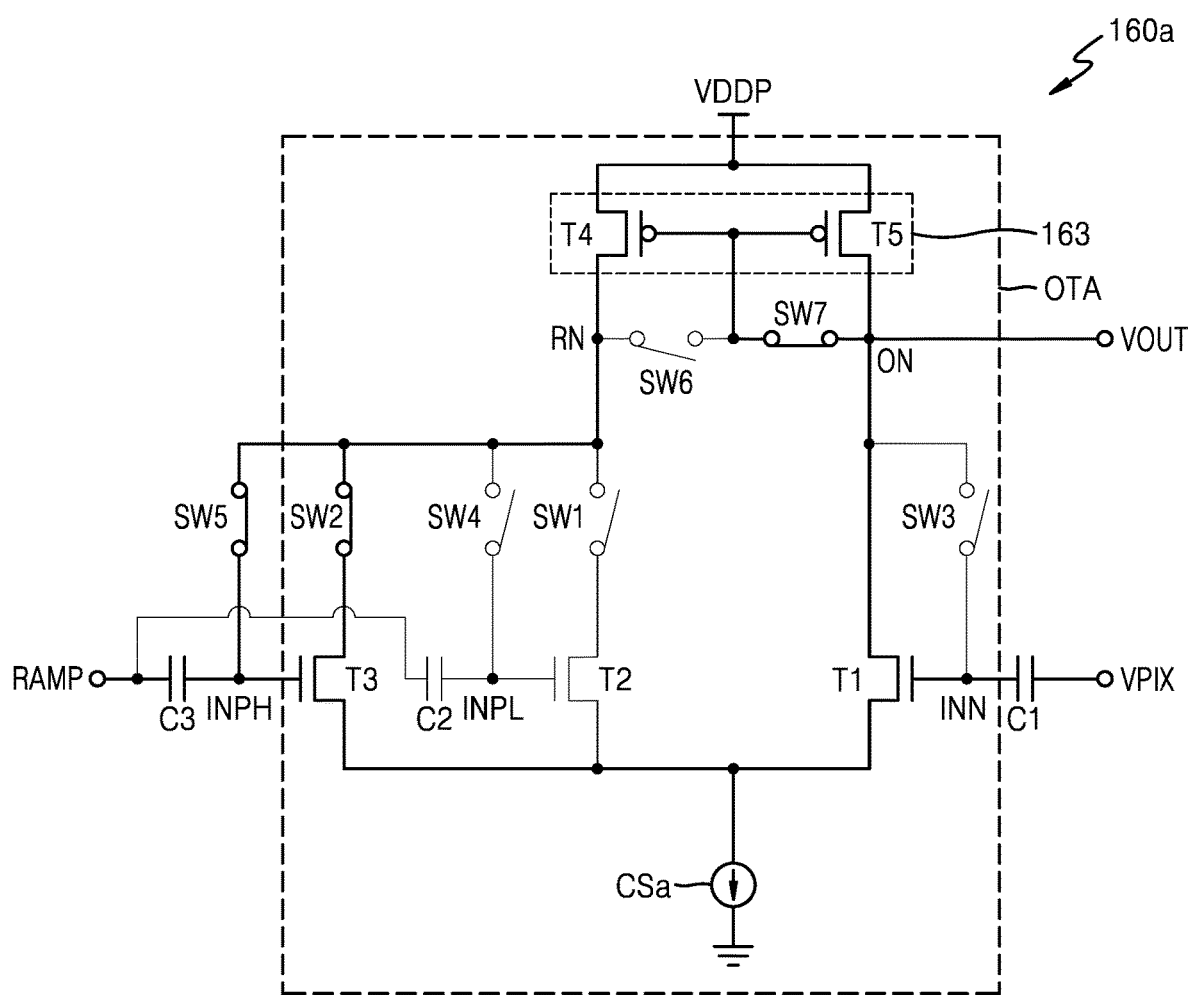

HCG reset ADC may be performed during the second sub-period SP2. At the time t2, the HCG switching signal may transition to the active level, and the LCG switching signal may transition to the inactive level. As shown in FIG. 8A, the second switch SW2 may be turned on and the first switch SW1 may be turned off. The first transistor T1, the third transistor T3, and the output stage 163 may constitute the OTA.

An interval from the time t2 to a time t3 may be a second auto-zero interval AZH. During the second auto-zero interval AZH, the AZ2 switching signal may have the active level, and the PS switching signal may have the inactive level. Accordingly, during the second auto-zero interval AZH, the CDS circuit 160a may perform a second auto-zero operation, and the fifth switch SW5 and the sixth seventh SW7 may be turned on. The third input node INPH and the comparison node RN may be connected to each other, and the gate terminals of the fourth transistor T4 and the fifth transistor T5 may be connected to the output node ON.

Figure 8B:
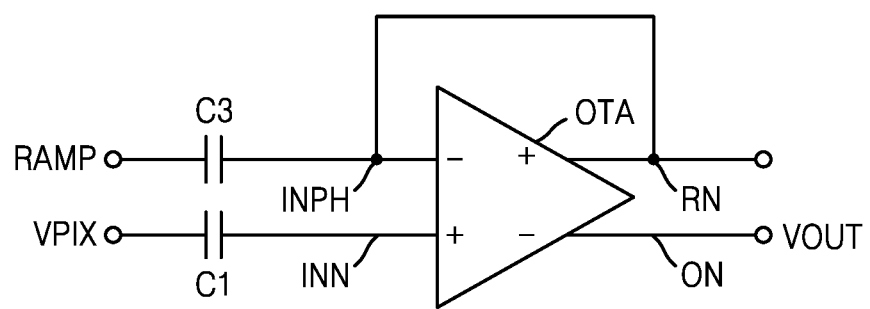

As shown in FIG. 8B, in the second auto-zero interval AZH, the first input node INN may be a positive input terminal of the OTA, the third input node INPH may be a negative input terminal of the OTA, the comparison node RN may be a positive output terminal of the OTA, and the output node ON may be a negative output terminal of the OTA.

The pixel voltage VPIX, that is, the HCG reset signal obtained by adding the offset voltage $\Delta V_{FD}$ to the LCG reset signal, may be applied to the first input node INN through the first capacitor C1, and the first input node INN may have a voltage level obtained by adding the offset voltage $\Delta V_{FD}$ to the first auto-zero voltage level. For example, when the offset voltage $\Delta V_{FD}$ has a negative value, the second auto-zero voltage level may be lower than the first auto-zero voltage level.

The voltage of the first input node INN may be equal to the voltage of the comparison node RN and the third input node INPH. Accordingly, a voltage level obtained by adding the offset voltage $\Delta V_{FD}$ to the first auto-zero voltage level may be determined as the second auto-zero voltage level.

As the gain control signal CGS transitions from the active level to the inactive level at the time t2, the coupling capacitance of the floating diffusion node FD may change, and the voltage of the floating diffusion node FD may vary (decrease or increase). The pixel voltage VPIX may vary by the voltage variation of the floating diffusion node FD, that is, the offset voltage $\Delta V_{FD}$. In this case, the offset voltage $\Delta V_{FD}$ may be difficult to predict and may be different for each pixel PX. When the pixel voltage VPIX to which the offset voltage $\Delta V_{FD}$ (e.g., a negative offset voltage or a positive offset voltage) is added is applied to the CDS circuit 160a, and when the CDS circuit 160a storing the first auto-zero level according to the LCG reset level operates based on the pixel voltage VPIX to which the offset voltage $\Delta V_{FD}$ is added, the pixel voltage VPIX may be lower than the lowest level of the ramp signal RAMP or may be higher than the highest level of the ramp signal RAMP. Accordingly, the voltage of the first input node INN, which varies according to the pixel voltage VPIX, may be lower than the lowest level of the second input node INPL, which varies according to the ramp signal RAMP, or may be higher than the highest level of the second input node INPL, and a time when the output voltage VOUT transitions may not occur. Also, an input range of the CDS circuit 160a may be narrow.

However, as described above, the CDS circuit 160a according to an embodiment of the disclosure may operate in the HCG mode during the second auto-zero interval AZH (from the time t2 to the time t3), and include the third transistor T3 connected to the third input terminal INPH, and perform the second auto-zero operation. Accordingly, the voltages of the first input node INN and the third input node INPH may be equal to the second auto-zero voltage level, which is obtained by adding the offset voltage $\Delta V_{FD}$ to the first auto-zero voltage level.

Figure 9:
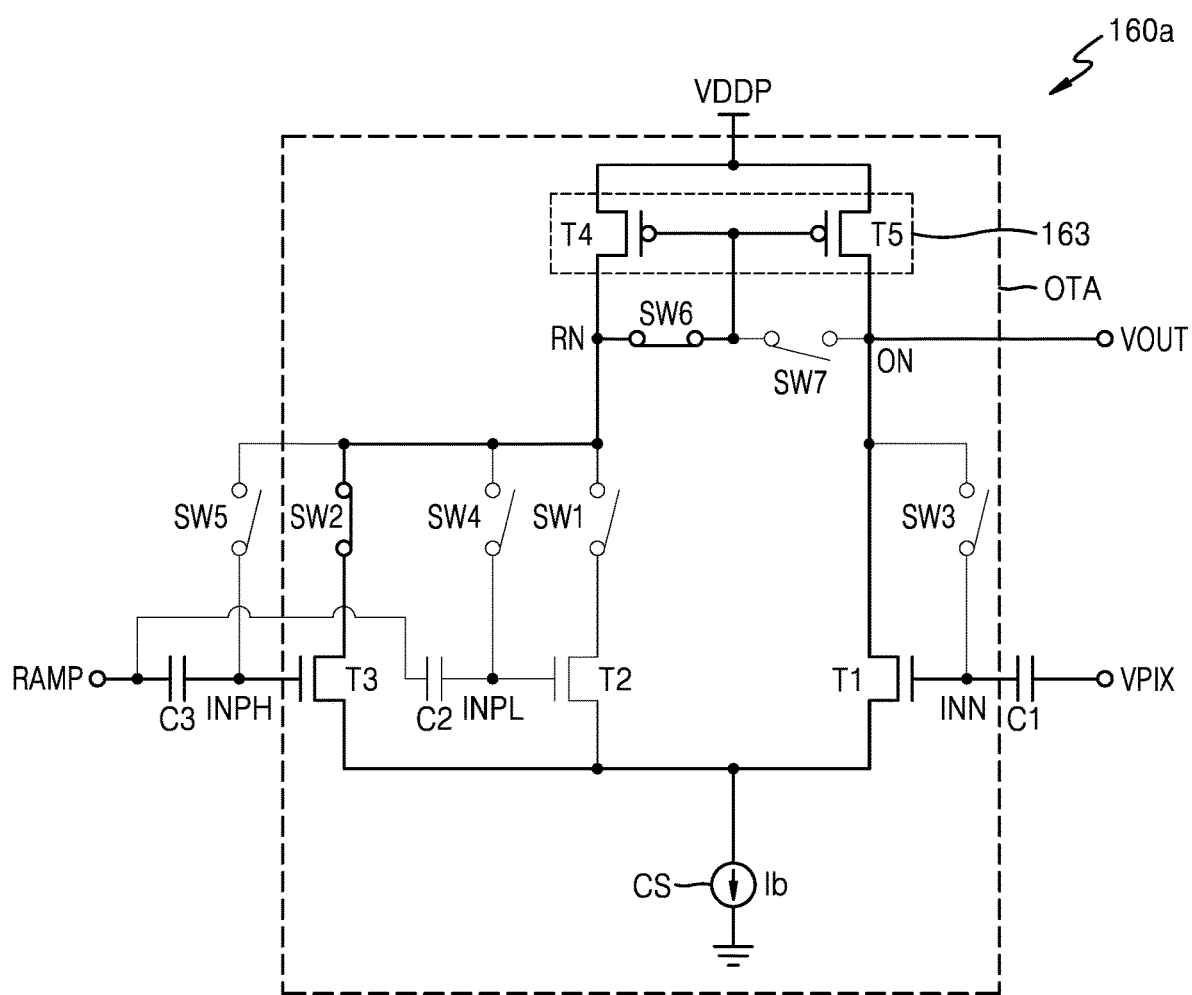

Continuously with reference to FIG. 5, at the time t3, the PS switching signal may transition to the active level, and the AZ2 switching signal may transition to the inactive level. Accordingly, as illustrated in FIG. 9, the fifth switch SW5 and the seventh switch SW7 may be turned off, and the sixth switch SW6 may be turned on. The gate terminals of the fourth transistor T4 and the fifth transistor T5 may be connected to the comparison node RN, and the third input node INPH and the comparison node RN may be disconnected from each other. Accordingly, sampling of the HCG reset signal applied to the first input node INN may be ended, and the second auto-zero voltage level in the HCG mode may be stored in the third capacitor C3.

The HCG reset signal may be read during an HCG reset signal determination period from the time t3 to a time t4. The ramp signal RAMP may fall at a predetermined inclination, and the voltage of the third input node INPH may fall at a predetermined inclination according to the ramp signal RAMP. The CDS circuit 160a may output a comparison signal indicating a time from when the ramp signal RAMP starts to fall to a time when the voltage of the first input node INN is the same as that of the third input node INPH.

HCG signal ADC may be performed during the third sub-period SP3 (from the time t4 to a time t8). The comparison circuit 160a may have the same connection relationship in the third sub-period SP3 as before the time point t4, and may sample the pixel voltage VPIX, that is, the HCG image signal, based on the second auto-zero voltage level.

The voltage of the first input node INN may vary according to the variation of the pixel voltage VPIX, and the voltage of the third input node INPH may vary according to the ramp signal RAMP. The CDS circuit 160a may output a comparison signal indicating a time from when the ramp signal RAMP starts to fall to a time when the voltage of the first input node INN is the same as that of the third input node INPH.

LCG signal ADC may be performed during the fourth sub-period SP4. At the time t8, the LCG switching signal may transition to the active level, and the HCG switching signal may transition to the inactive level. Accordingly, as shown in FIG. 7, the second switch SW2 may be turned off, the first switch SW1 may be turned on, and the first transistor T1, the second transistor T2, and the output stage 163 may constitute the OTA. The first auto-zero voltage level in the LCG mode is stored in the second capacitor C2, and thus the comparison circuit 160a may sample the pixel voltage VPIX, that is, the LCG image signal, based on the first auto-zero voltage level. The voltage of the first input node INN may vary according to the variation of the pixel voltage VPIX, and the voltage of the second input node INPL may vary according to the ramp signal RAMP. The CDS circuit 160a may output a comparison signal indicating a time from when the ramp signal RAMP starts to fall to a time when the voltage of the first input node INN is the same as that of the second input node INPH.

As described above with reference to FIGS. 4 to 9, the CDS circuit 160a according to an embodiment of the disclosure may include the first transistor T1 connected to the first input node INN and the second transistor T2 connected to the second input node INPL that operate as a differential input pair of the OTA in the LCG mode, and the first transistor T1 and the third transistor T3 connected to the third input node INPH that operate as a differential input pair of the OTA in the HCG mode. The CDS circuit 160a may determine the first auto-zero voltage level by performing the first auto-zero operation according to the LCG reset signal during the first auto-zero interval in the LCG mode, and determine the second auto-zero voltage level by adding the offset voltage $\Delta V_{FD}$ included in the HCG reset level to the first auto-zero voltage level during the second auto-zero interval in the HCG mode.

As shown in FIG. 4, in the CDS circuit 160a according to an embodiment of the disclosure, the input stage 161 may include a differential input pair including two transistors (e.g., the first transistor T1 and the second transistor T2) and a pair of capacitors (e.g., the first capacitor C1 and the second capacitor C2), and may further include the third transistor T3 and the third capacitor C3. Accordingly, the size of the CDS circuit 160a may be reduced compared to the case in which a CDS circuit includes two differential input pairs and two pairs of capacitors (that is, two input stages) for receiving HCG signals (such as the HCG reset signal and the HCG image signal) and LCG signals (such as the LCG reset signal and the LCG image signal), respectively.

Figure 10:
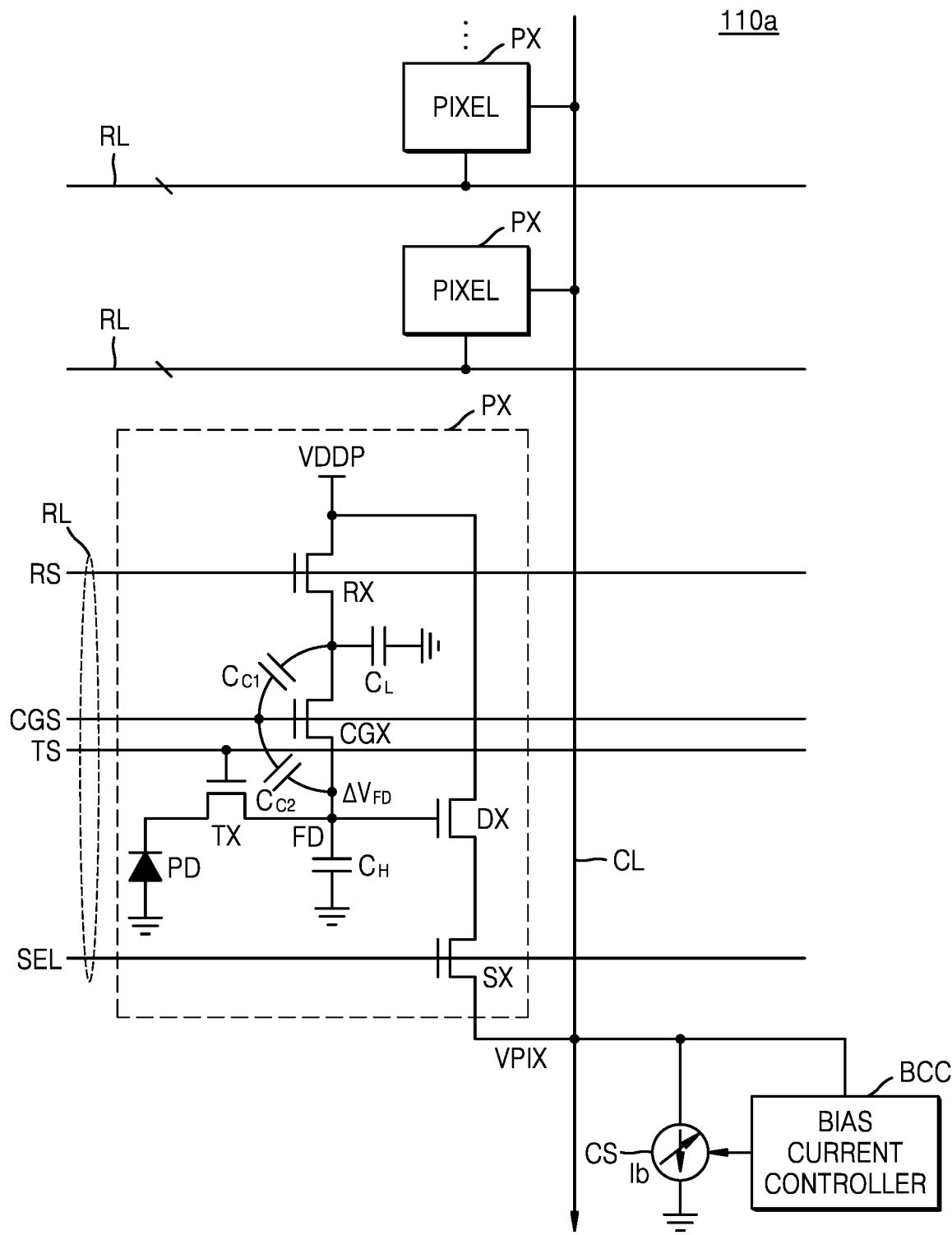
FIG. 10 is a diagram illustrating a pixel array of an image sensor according to an embodiment of the disclosure.

FIG. 10 is a diagram illustrating a pixel array 110a of an image sensor according to an embodiment of the disclosure. For convenience of description, one column of the pixel array 110a is illustrated.

Referring to FIG. 10, the pixel array 110a may include the plurality of pixels PX, the current source CS, and a bias current controller BCC. In FIG. 10, for convenience of description, one column line CL and components connected to the column line CL, for example, the plurality of pixels PX, the current source CS, and the bias current controller BCC are illustrated, but the disclosure is not limited thereto, and as described with reference to FIG. 1, the pixel array 110a may include the plurality of column lines CL and components respectively connected to the plurality of column lines CL.

The driving transistor DX of the pixel PX may operate as a source follower based on the bias current Ib provided from the current source CS. Because one pixel PX is selected from among the plurality of pixels PX connected to the column line CL, the bias current Ib may flow through the driving transistor DX of the selected pixel PX. In other words, the bias current Ib may be the drain current of the driving transistor DX.

The gain control signal CGS may be received through one of the plurality of row lines RL, and coupling capacitors Cc1 and Cc2 may be formed between the row line RL and other nodes. When the pixel PX is switched from an LCG mode to an HCG mode or from the HCG mode to the LCG mode, the coupling capacitance may change as the gain control signal CGS changes. The offset voltage $\Delta V_{FD}$ may be added to the voltage of the floating diffusion node FD by a change in the coupling capacitance and a random charge injection. The offset voltage $\Delta V_{FD}$ may be a positive voltage or a negative voltage. The pixel voltage VPIX changes by the offset voltage $\Delta V_{FD}$, and an LCG reset signal and an HCG reset signal output at the pixel voltage VPIX may be different.

In an example embodiment, when the pixel PX is switched from the LCG mode to the HCG mode or from the HCG mode to the LCG mode, the bias current controller BCC may adjust the bias current Ib of the current source CS based on the pixel voltage VPIX, thereby canceling the offset voltage $\Delta V_{FD}$ from the pixel voltage VPIX. Accordingly, the LCG reset signal may be maintained substantially the same as the HCG reset signal.

For example, when the pixel PX is switched from the LCG mode to the HCG mode, and when the voltage of the floating diffusion node FD is lowered by the offset voltage $\Delta V_{FD}$, the pixel voltage VPIX may also be lowered. In this case, the bias current controller BCC may reduce the bias current Ib based on a reduction in the pixel voltage VPIX. As the bias current Ib decreases, the pixel voltage VPIX may increase. As described above, the bias current controller BCC may adjust the bias current Ib based on a negative feedback operation, thereby preventing the pixel voltage VPIX from substantially varying due to the offset voltage $\Delta V_{FD}$.

Figure 11:
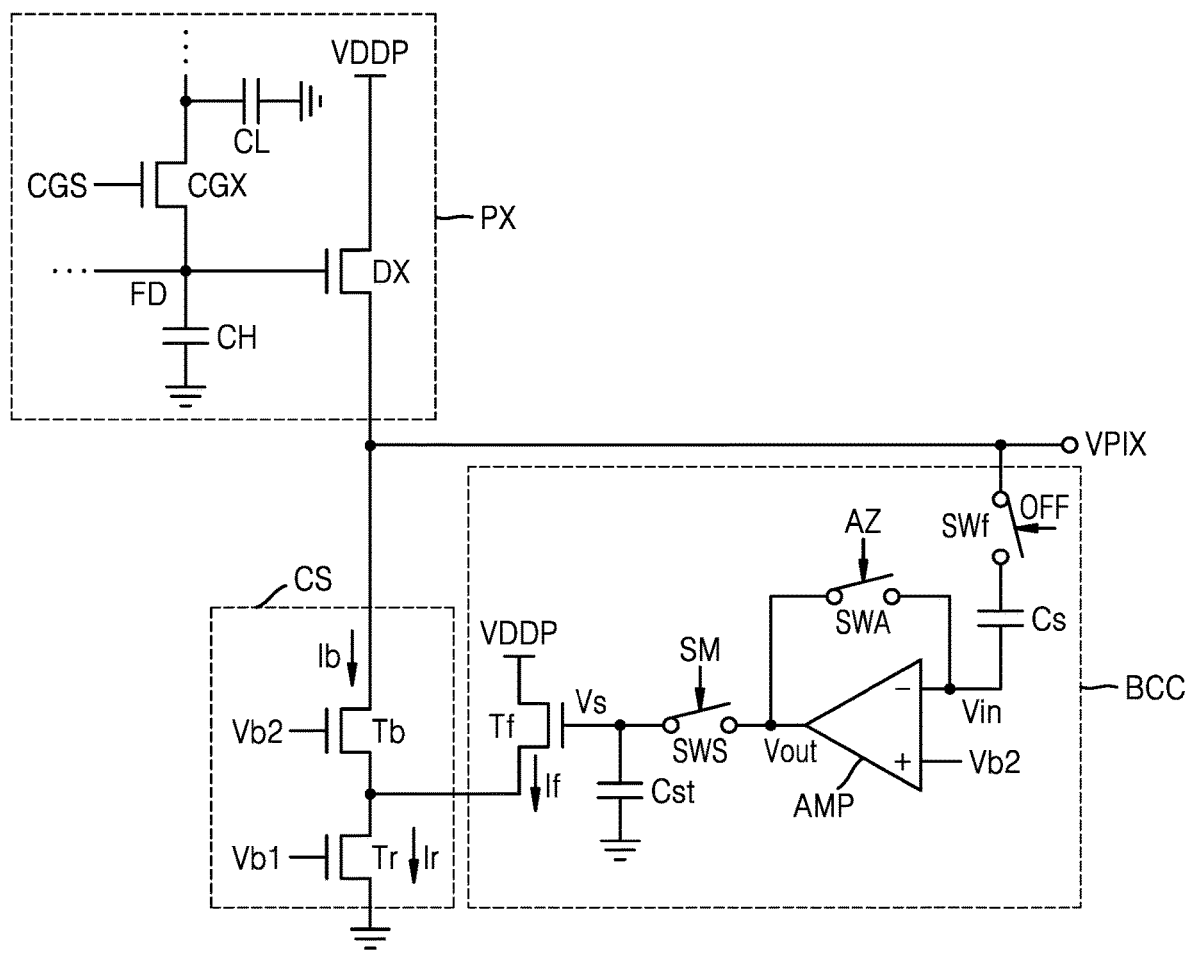
FIG. 11 is a circuit diagram illustrating a current source and a bias current controller provided in a pixel array according to an embodiment of the disclosure.

FIG. 11 is a circuit diagram illustrating the current source CS and the bias current controller BCC provided in a pixel array according to an embodiment of the disclosure. For convenience of description, some configurations of the selected pixel PX are illustrated together, and column lines are omitted.

Referring to FIG. 11, the current source CS may include a reference transistor Tr and a bias transistor Tb. The reference transistor Tr may generate a reference current Ir based on a first bias voltage Vb1 applied to a gate terminal. The bias transistor Tb may generate the bias current Ib based on a second bias voltage Vb2 applied to the gate terminal, and one end of the bias transistor Tb may be connected to a source terminal of the driving transistor DX of the pixel PX and the other end of the bias transistor Tb may be connected to one end of the reference transistor Tr.

The bias current controller BCC may include a feedback transistor Tf, an amplifier AMP, a feedback switch SWf, a sampling switch SWS, an auto-zero switch SWA, a sampling capacitor Cs, and a storage capacitor Cst.

The feedback switch SWf may be turned on in response to an active level of an OFF switching signal. When the feedback switch SWf is turned on, the sampling capacitor Cs may DC block the pixel voltage VPIX to provide an AC signal of the pixel voltage VPIX to the amplifier AMP.

The auto zero switch SWA may be connected between a first input terminal (−) and an output terminal of the amplifier AMP, may be turned on in response to the active level of an AZ switching signal, and may perform an auto-zero operation, thereby canceling an offset of the amplifier AMP.

The amplifier AMP may amplify the voltage difference between an input voltage Vin received through the first input terminal (−) and a second bias voltage Vb2 received through a second input terminal (+) and may output the amplified voltage as an output voltage Vout. The input voltage Vin may vary according to the voltage stored in the sampling capacitor Cs.

The sampling switch SWS may be turned on in response to the active level of an SM switching signal and may store the output voltage Vout in the storage capacitor Cst. Accordingly, a sampling voltage Vs may be the same as the output voltage Vout.

The feedback transistor Tf may generate a feedback current If based on a sampling voltage Vs applied to the gate terminal of the feedback transistor Tf. The power voltage VDDP may be applied to one end of the feedback transistor Tf, and the other end of the feedback transistor Tf may be connected to one end of the reference transistor Tr. The sum of the bias current Ib and the feedback current If may be the same as the reference current Ir, the reference current Ir may be constant, and the bias current Ib and the feedback current If may vary according to the sampling voltage Vs. The operations of the current source CS and the bias current controller BCC will be described in detail with reference to FIGS. 12 and 13A to 13C.

Figure 12:
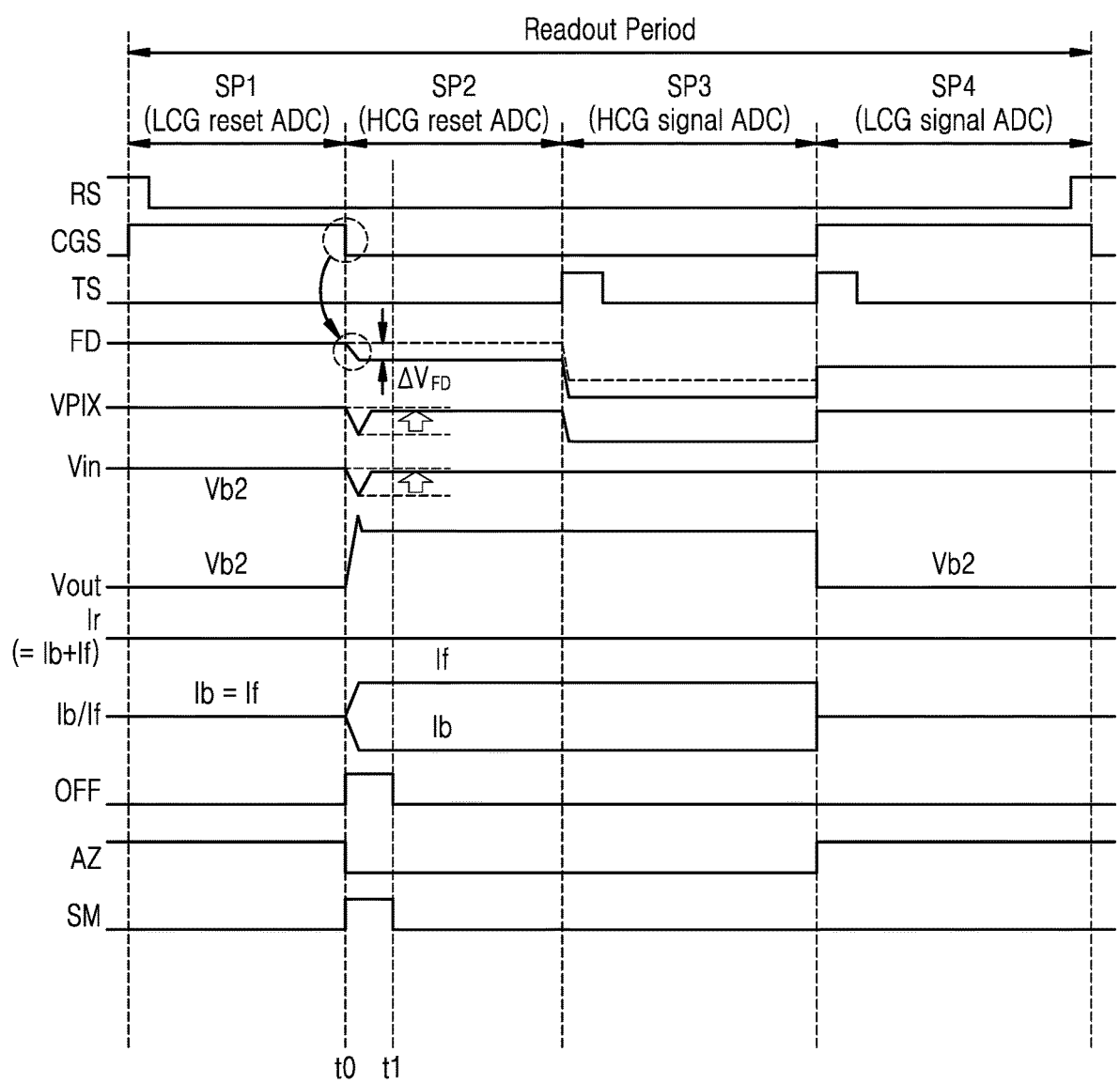
FIG. 12 is a timing diagram of a bias current controller according to an embodiment of the disclosure.
Figure 13A:
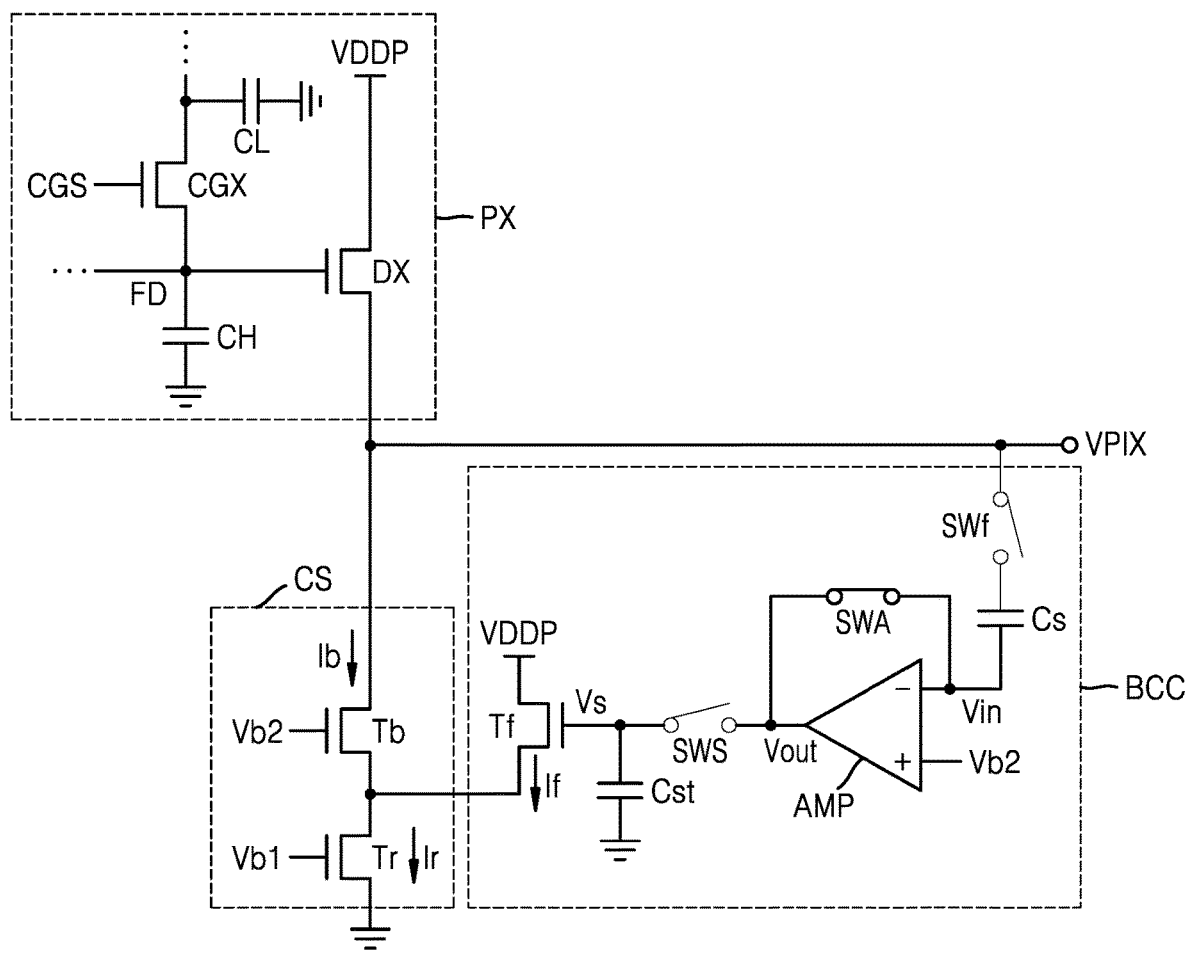
FIGS. 13A to 13C illustrate the operation of a bias current controller according to switching signals applied to the bias current controller.
Figure 13B:
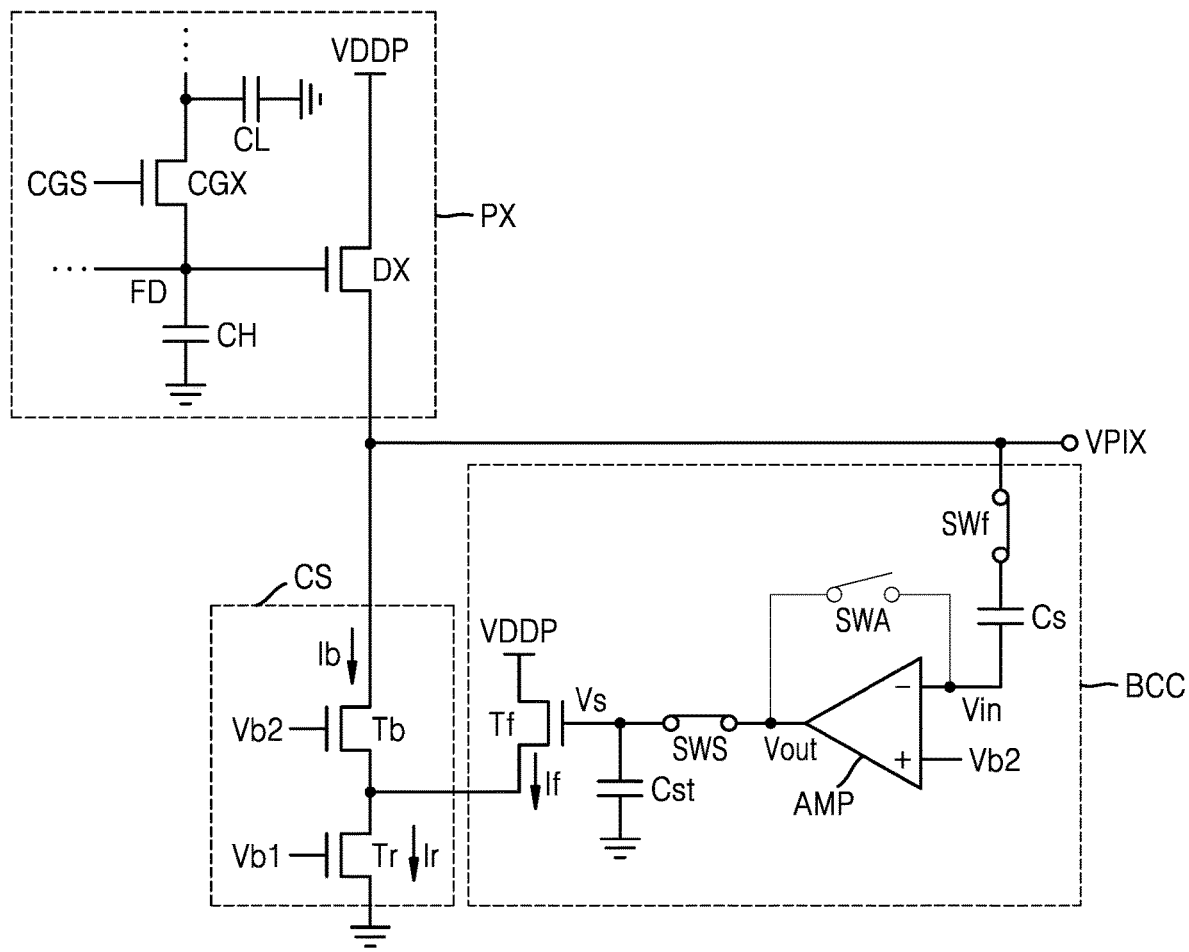
Figure 13C:
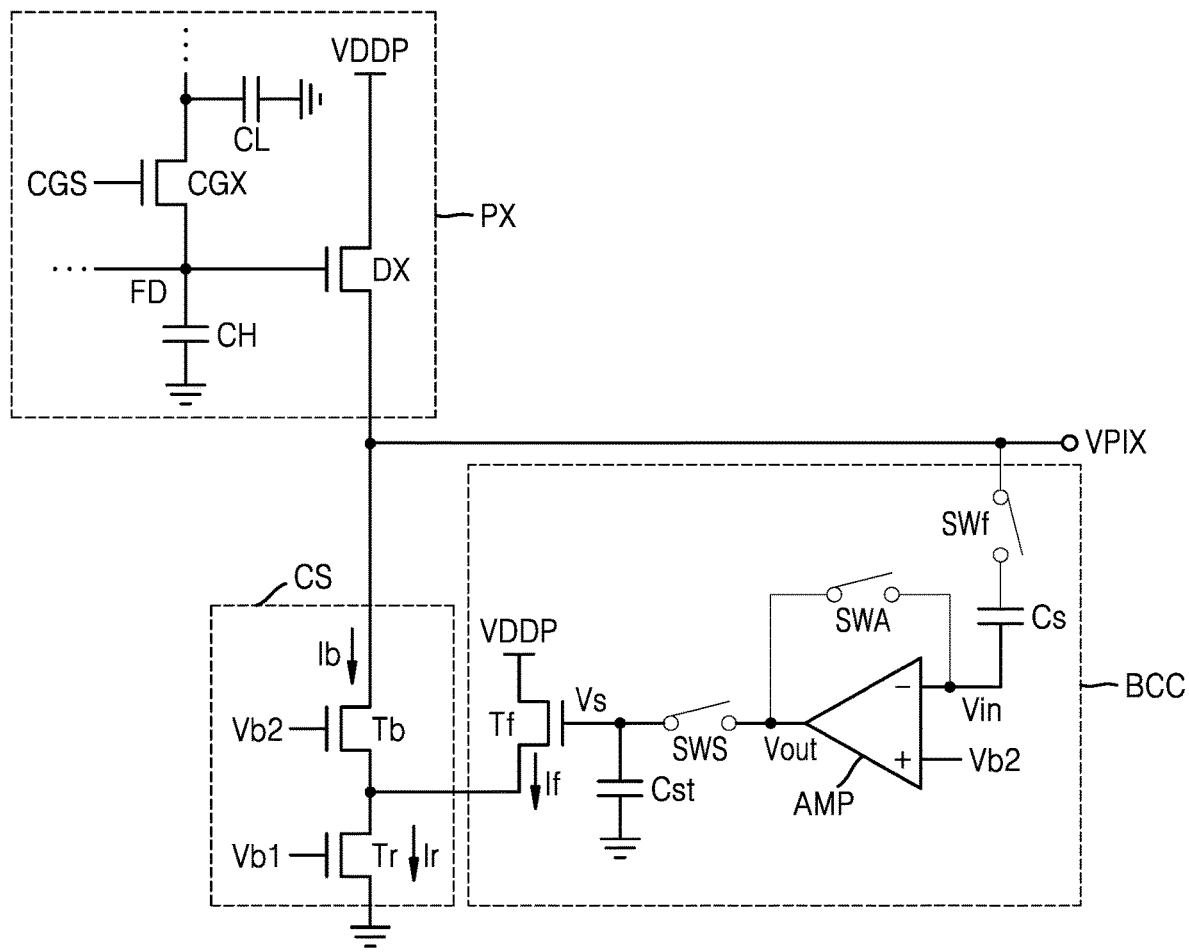

FIG. 12 is a timing diagram of the bias current control BCC according to an embodiment of the disclosure. FIGS. 13A to 13C illustrate the operation of the bias current controller BCC according to switching signals applied to the bias current controller BCC.

For convenience of description, control signals provided to the pixel PX (of FIG. 2) and the voltage of the floating diffusion node FD are illustrated together. The first to fourth sub-periods SP1 to SP4 of a readout period, the reset signal RS, the gain control signal CGS, and the transfer signal TS are described above with reference to FIG. 3, and thus detailed descriptions thereof will be omitted.

Referring to FIG. 12, during the first sub-period SP1 in which LCG reset ADC is performed, the OFF switching signal and the SM switching signal may have an inactive level, and the AZ switching signal may have an active level. As shown in FIG. 13A, the feedback switch SWf and the sampling switch SWS may be turned off, and the auto-zero switch SWA may be turned on. The second bias voltage Vb2 may be received by the first input terminal (+) of the amplifier AMP, and according to an auto-zero operation, the first input terminal (+), the second input terminal (−), and an output terminal of the amplifier AMP may have a voltage level of the second bias voltage Vb2, and an offset of the amplifier AMP may be canceled. In this case, the sampling voltage Vs may have a voltage level of the second bias voltage Vb2, and the bias current Ib may be the same as the feedback current If.

In the beginning of the second sub-period SP2 in which HCG reset ADC is performed, for example, at the time t0, the OFF switching signal and the SM switching signal may transition to an active level, and the AZ switching signal may transition to an inactive level. As shown in FIG. 13B, the feedback switch SWf and the sampling switch SWS may be turned on, and the auto-zero switch SWA may be turned off.

The voltage of the floating diffusion node FD may be lowered by the offset voltage $\Delta V_{FD}$, and the pixel voltage VPIX may also be lowered by the offset voltage $\Delta V_{FD}$. The sampling capacitor Cs may sample and hold the AC component of the pixel voltage VPIX. The voltage level of the input voltage Vin may be lowered by the offset voltage $\Delta V_{FD}$ from the first bias voltage Vb1, and the amplifier AMP may amplify and output the voltage difference between the input voltage Vin and the first bias voltage Vb1. Accordingly, the output voltage Vout may increase. The output voltage Vout may be applied to the feedback transistor Tf as the sampling voltage Vs. Accordingly, the feedback current If may increase, and the bias current Ib may decrease. The sampling voltage Vs may be stored in the storage capacitor Cst.

As the bias current Ib decreases, the pixel voltage VPIX and the input voltage Vin may increase, and the output voltage Vout may decrease. According to a negative feedback operation of the bias current controller BCC, the pixel voltage Vout, for example, the HCG reset signal, may be the same as a previous level, for example, the LCG reset signal.

Thereafter, the OFF switching signal and the SM switching signal may transition to an inactive level at the time t1. As shown in FIG. 13C, the feedback switch SWf, the sampling switch SWS, and the auto-zero switch SWA may be turned off. After the time t1, HCG reset ADC may be performed, and the HCG signal ADC may be performed during the third sub-period SP3.

Thereafter, the AZ switching signal may transition to the active level during the fourth sub-period SP4 in which LCG signal ADC is performed, and the amplifier AMP may perform an auto-zero operation as described with respect to the first sub-period SP1. The output voltage Vout and the sampling voltage Vs may have a voltage level of the second bias voltage Vb2, and the bias current Ib may be the same as the feedback current If. LCG signal ADC may be performed under the same conditions as the first sub-period SP4.

According to the negative feedback operation of the bias current controller BCC according to an embodiment of the disclosure described with reference to FIGS. 10 to 13C, even if a conversion gain mode of the pixel PX changes, the offset voltage $\Delta V_{FD}$ of the floating diffusion node FD may not be added to the pixel voltage VPIX, and the LCG reset signal may be maintained substantially the same as the HCG reset signal.

When the LCG reset signal is different from the HCG reset signal, two CDS circuits may be used or the CDS circuit needs to include two differential input pairs, to store an auto-zero voltage level according to the LCG reset signal and an auto-zero voltage level according to the HCG reset signal. Therefore, the area of the ADC circuit 150 may increase. However, in the pixel array 110a according to an embodiment of the disclosure, because the LCG reset signal is maintained substantially the same as the HCG reset signal according to the negative feedback operation of the bias current controller BCC, the CDS circuit may perform the auto-zero operation during the first sub-period SP1 to store the auto-zero voltage level according to the LCG reset signal, and thus one CDS circuit including one differential input pair may be used. Accordingly, the image sensor 100 may read LCG signals and HCG signals according to the RRSS read method from the pixel PX supporting a dual conversion gain without increasing the area of the ADC circuit 150. Also, because the auto-zero operation is not required during the second sub-period SP2, the readout period may be reduced.

Figure 14:
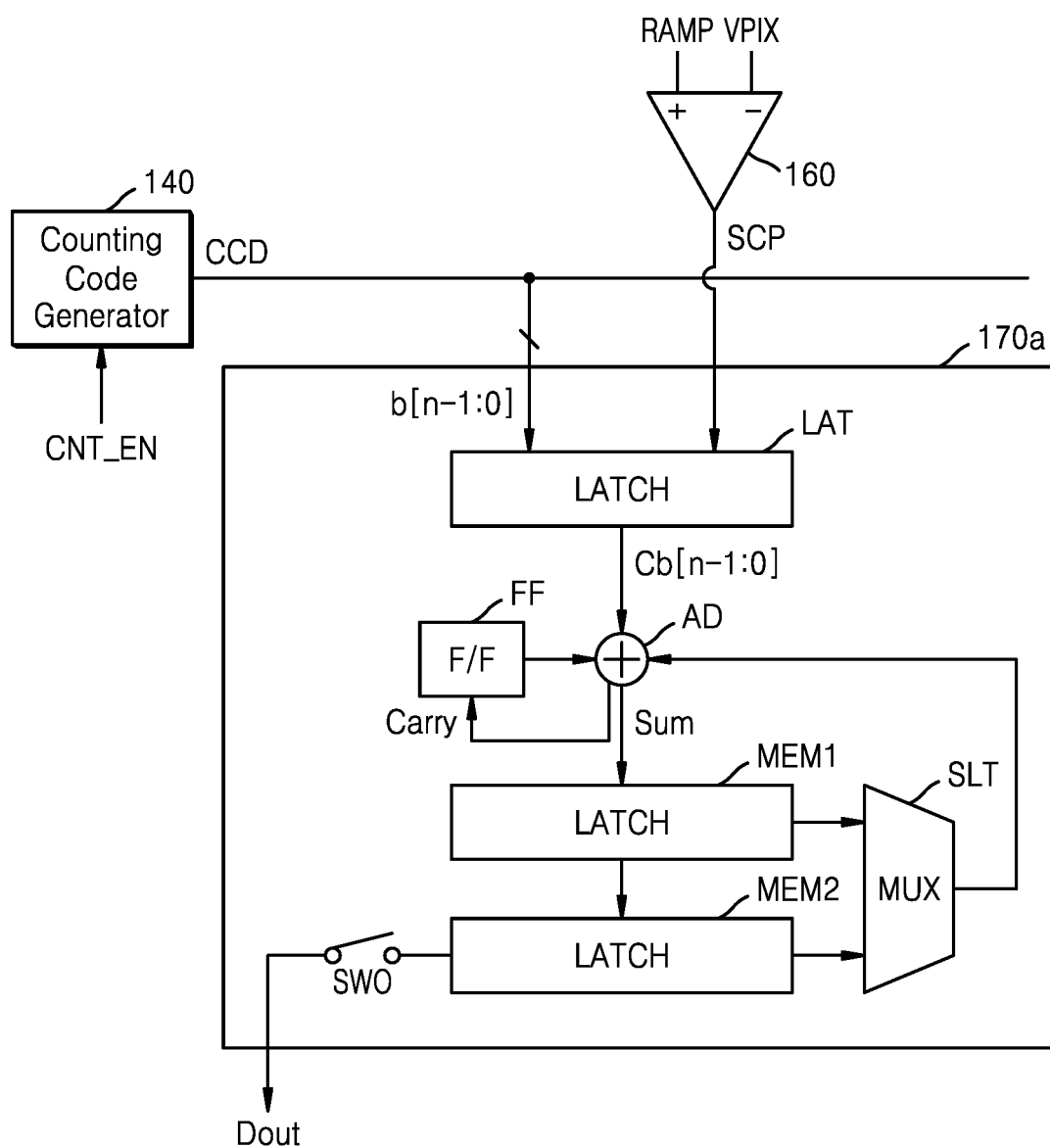
FIG. 14 is a diagram illustrating a counter circuit according to an embodiment of the disclosure.
Figure 15:
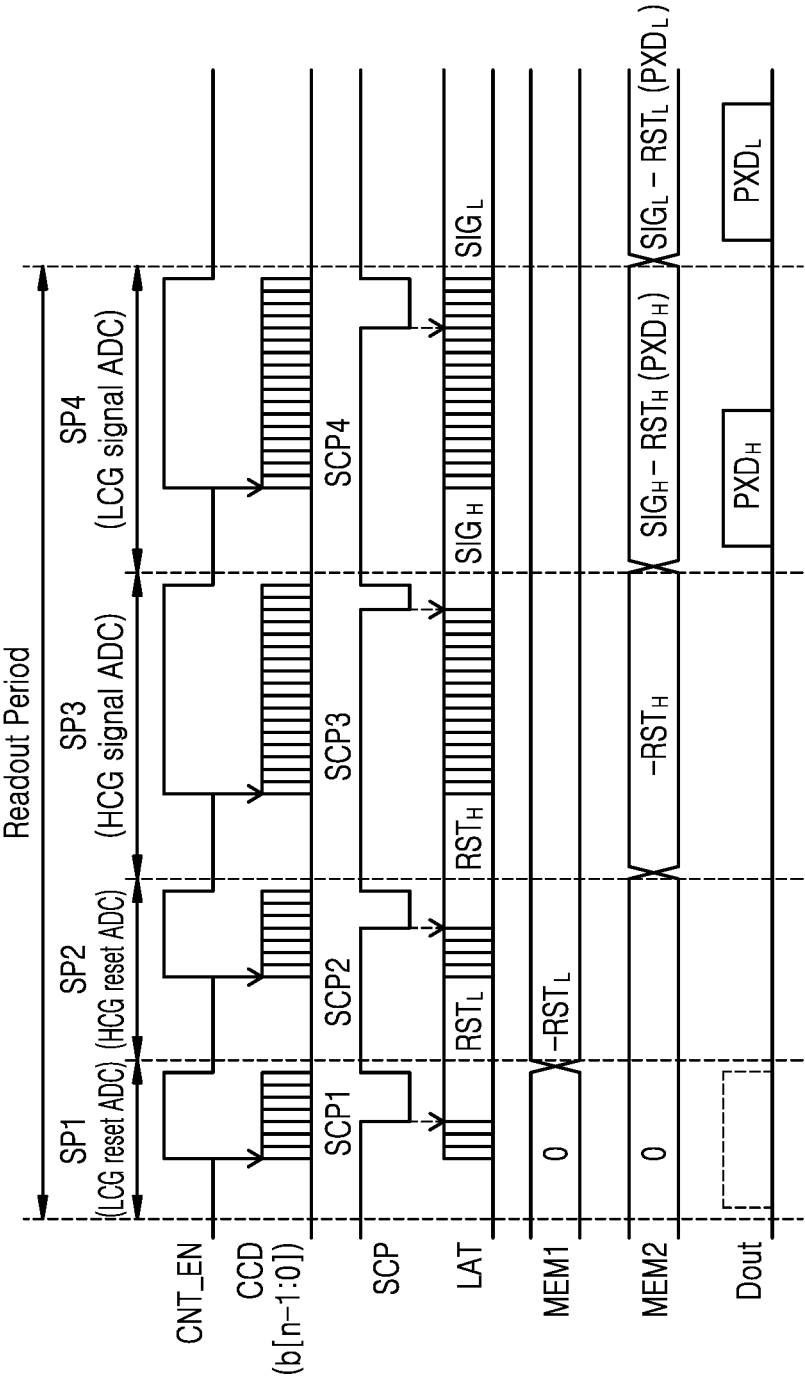
FIG. 15 is a timing diagram illustrating an operation of the counter circuit of FIG. 14.

FIG. 14 is a diagram illustrating a counter circuit 170a according to an embodiment of the disclosure. FIG. 15 is a timing diagram illustrating an operation of the counter circuit 170a of FIG. 14.

Referring to FIG. 14, the counter circuit 170a may include a latch LAT, a first memory MEM1, a second memory MEM2, a selector SLT, and an adder AD. The counter circuit 170a may further include a flip-flop FF. The counter circuit 170a may receive the counting code CCD from the counting code generator 140, receive the comparison signal SCP from the CDS circuit 160, and generate an HCG pixel value and an LCG pixel value based on the counting code CCD and the comparison signal SCP. In FIG. 14, the counter circuit 170a receives the comparison signal SCP from one CDS circuit 160, but is not limited thereto. In an embodiment, the counter circuit 170a may receive comparison signals from a CDS circuit processing LCG signals, for example, an LCG reset signal and an LCG image signal, and a CDS circuit processing HCG signals, for example, an HCG reset signal and an HCG image signal.

In an embodiment, the counting code generator 140 may be a gray code generator, and a gray code having a code value increasing over time may be provided to the counter circuit 170a as the counting code CCD. Referring to FIG. 15, the counting code generator 140 may output the counting code CCD in response to a counting enable signal CNT_EN during the first to fourth sub-periods SP1 to SP4 of a readout period. The code value of the counting code CCD may increase over time. The counting code CCD may include n-bit data (b[n-1:0]) (n is a positive integer equal to or greater than 2). The n-bit data b[n-1:0] of the counting code CCD may be simultaneously provided to the latch LAT.

The latch LAT may receive the comparison signal SCP and the counting code CCD, latch a code value of the counting code CCD at the time when the level of the comparison signal SCP transitions (e.g., transition from logic high to logic low), and output the latched code value as a counting value. The latch LAT may be an n-bit latch, and may include n 1-bit latches, for example, n unit latches. The counting value may include n-bit counting data Cb[n-1:0], and a latch LAT1 may sequentially output the n-bit counting data Cb[n-1:0] by 1-bit.

The latch LAT may sequentially receive a first comparison signal SCP1 according to the LCG reset signal, a second comparison signal SCP2 according to the HCG reset signal, a third comparison signal SCP3 according to the HCG image signal, and a fourth comparison signal SCP4 according to the LCG image signal from the CDS circuit 160, and may respectively output first to fourth counting values according to the first to fourth comparison signals SCP1 to SCP4. The first counting value may be an LCG reset value $RST_L$ with respect to the LCG reset signal, the second counting value may be the HCG reset value $RST_H$ with respect to the HCG reset signal, the third counting value may be an HCG signal value SIGH with respect to the HCG image signal, and the fourth counting value may be an LCG signal value $SIG_L$ with respect to the LCG image signal.

The first memory MEM1 and the second memory MEM2 may be implemented as a storage such as a latch or SRAM. The LCG reset value $RST_L$, that is, the first counting value, may be stored in the first memory MEM1. In this case, a negative value $-RST_L$ of the LCG reset value $RST_L$ (hereinafter referred to as a negative LCG reset value) may be stored. For example, the LCG reset value $RST_L$ may be converted to a binary code, and a one's complement value or a two's complement value of the binary code may be stored in the first memory MEM1. The HCG reset value $RST_H$, that is, the second counting value, may be stored in the second memory MEM2. In this case, a negative value $-RST_H$ of the HCG reset value $RST_H$ (hereinafter referred to as a negative HCG reset value) may be stored.

The HCG signal value $SIG_H$, that is, the third counting value, may be output from the latch LAT to the adder AD. In this case, the selector SLT may select the negative HCG reset value $-RST_H$ stored in the second memory MEM2 and provide the negative HCG reset value $-RST_H$ to the adder AD. The selector SLT may be implemented as, for example, a multiplexer, and a control signal of the selector SLT, for example, a selection signal, may be received from the timing controller 190.

The adder AD may sum the HCG signal value $SIG_H$ and the negative HCG reset value $-RST_H$. In an embodiment, the adder AD may be implemented as a 1-bit adder, and the adder AD may sequentially receive and sum the HCG signal value $SIG_H$ and the negative HCG reset value $-RST_H$ from the least significant bit (LSB) by 1-bit. In this case, a carry generated by the summation may be stored in the flip-flop FF, and may be provided to the adder AD when the next bit is summed.

A summation value $SIG_H$-$RST_H$ of the HCG signal value $SIG_H$ and the negative HCG reset value $-RST_H$, for example, an HCG pixel value $PXD_H$, may be stored in the second memory MEM2 and then output as the output data Dout when an output switch SWO is turned on. The control signal of the output switch SWO, for example, a switching signal, may be received from the timing controller 190 or the column decoder 182 (in FIG. 1).

The LCG signal value $SIG_L$, that is, the fourth counting value, may be output from the latch LAT to the adder AD. The selector SLT may select the negative LCG reset value $-RST_L$ stored in the first memory MEM1 and provide the negative LCG reset value $-RST_L$ to the adder AD.

The adder AD may sum the LCG signal value $SIG_L$ and the negative LCG reset value $-RST_L$. A summation value $SIG_L$-$RST_L$, for example, the LCG pixel value $PXD_L$, may be stored in the second memory MEM2, and then output as the output data Dout when the output switch SWO is turned on.

As described above, the counter circuit 170a according to an embodiment of the disclosure may store the negative LCG reset value $-RST_L$ and the negative HCG reset value $-RST_H$ in the first memory MEM1 and the second memory MEM2, respectively, and when generating the LCG pixel value $PXD_L$ and the HCG pixel value $PXD_H$, that is, when performing an addition operation, the selector SLT may selectively provide the negative LCG reset value $-RST_L$ and the negative HCG reset value $-RST_H$ to the adder AD. Accordingly, one data operation path (e.g., the latch LAT, the adder AD, and the flip-flop FF) may generate the LCG pixel value $PXD_L$ and the HCG pixel value $PXD_H$. Accordingly, the circuit area of the counter circuit 170a may be reduced compared to the circuit area in the case where two counter circuits each including one data operation path generate the LCG pixel value $PXD_L$ and the HCG pixel value $PXD_H$, respectively.

Figure 16:
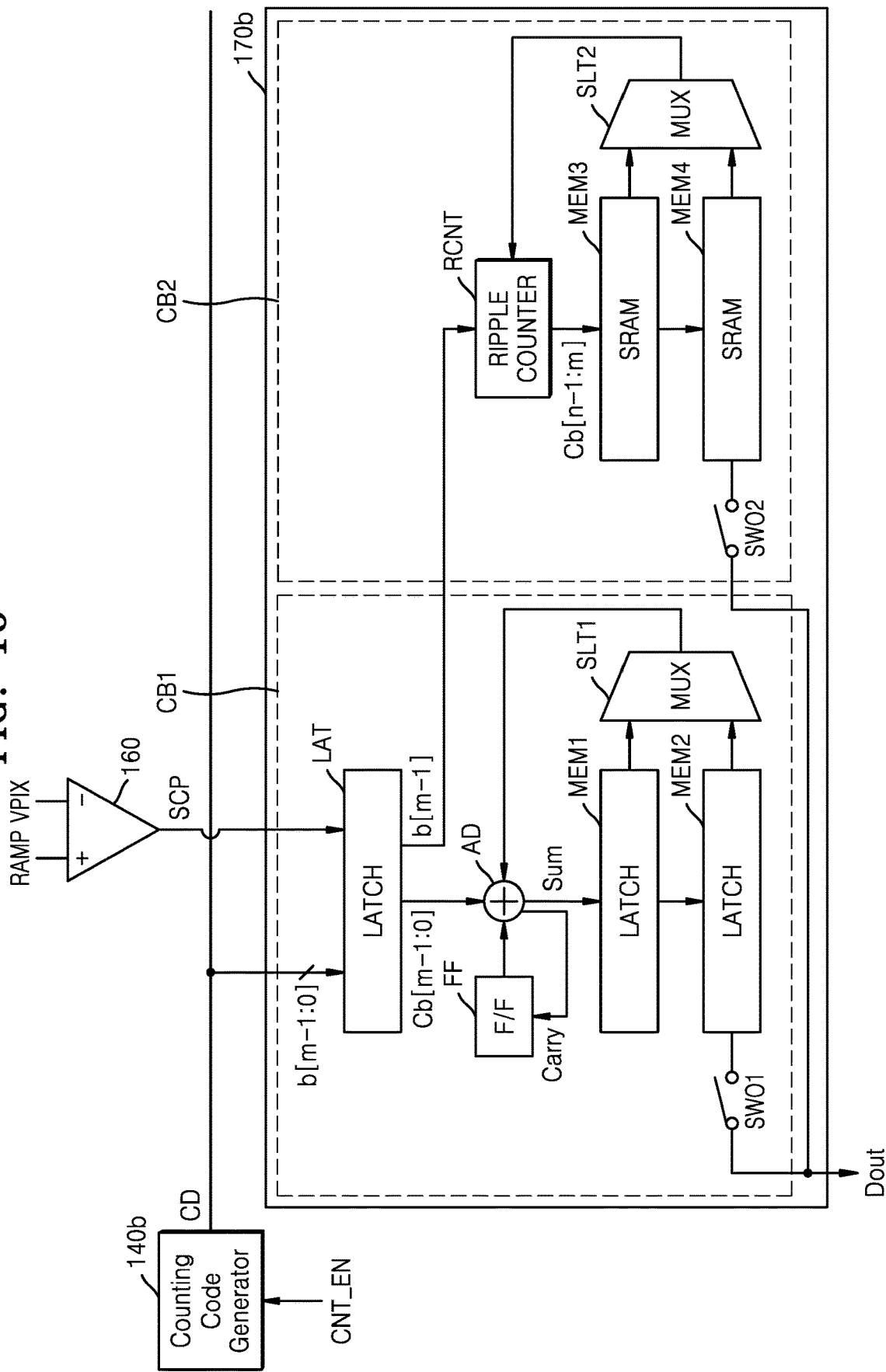
FIG. 16 is a diagram illustrating a counter circuit according to an embodiment of the disclosure.
Figure 17:
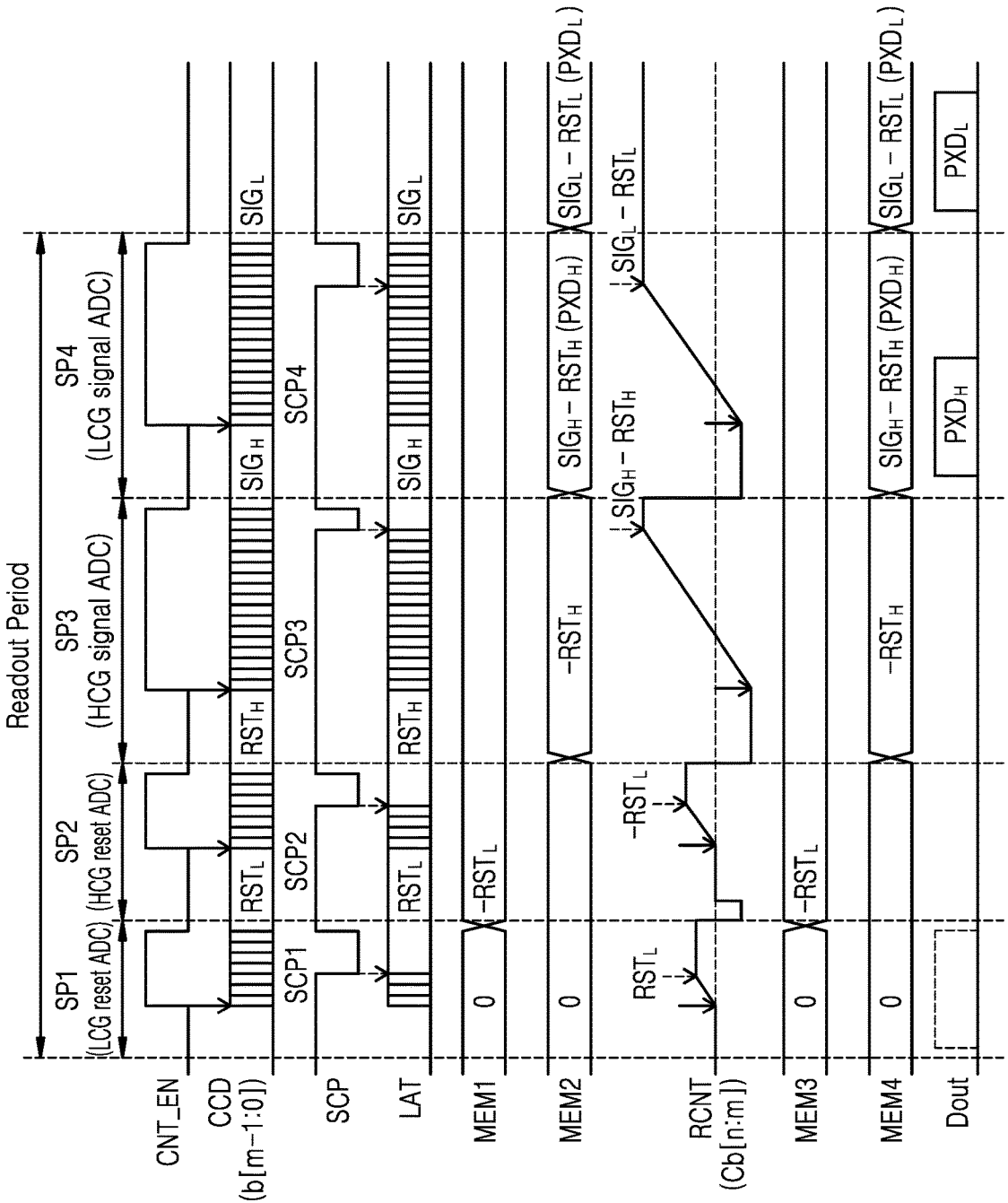
FIG. 17 is a timing diagram illustrating an operation of the counter circuit of FIG. 16.

FIG. 16 is a diagram illustrating a counter circuit 170b according to an embodiment of the disclosure. FIG. 17 is a timing diagram illustrating an operation of the counter circuit 170b of FIG. 16.

Referring to FIG. 16, the counter circuit 170b may include a first counter CB1 and a second counter CB2. The first counter CB1 may include the latch LAT, the first memory MEM1, the second memory MEM2, the first selector SLT1, and the adder AD. The first counter CB1 may further include the flip-flop FF. The second counter CB2 may include a ripple counter RCNT, a third memory MEM3, a fourth memory MEM4, and a second selector SLT2.

The counter circuit 170b may generate the HCG pixel value and the LCG pixel value based on the counting code CCD received from the counting code generator 140b and the comparison signal SCP received from the CDS circuit 160. The first counter CB1 may generate lower bits of the HCG pixel value and the LCG pixel value. The second counter CB2 may generate upper bits of the HCG pixel value and the LCG pixel value. For example, when each of the HCG pixel value and the LCG pixel value includes n-bit data, the first counter CB1 may generate lower m-bit data (m is a positive integer smaller than n) and the second counter CB2 may generate upper (n-m)-bit data. Hereinafter, in FIG. 17 and the description thereof, counting values and summation values described in connection with configurations of the first counter CB1, for example, the latch LAT, the first memory MEM1, and the second memory MEM2, may mean the lower n-bit data of the corresponding value among the LCG reset value $RST_L$, the HCG reset value $RST_H$, the HCG signal value $SIG_H$, the LCG signal value $SIG_L$, the HCG pixel value $PXD_H$, and the LCG pixel value $PXD_L$, and counting values and summation values described in connection with configurations of the second counter CB2, for example, the ripple counter RCNT, the third memory MEM3, and the fourth memory MEM4, may mean the upper (n-m)-bit data of the corresponding value among the LCG reset value $RST_L$, the HCG reset value $RST_H$, the HCG signal value $SIG_H$, the LCG signal value $SIG_L$, the HCG pixel value $PXD_H$, and the LCG pixel value $PXD_L$.

Referring to FIG. 17 together, the counting code generator 140b may output the counting code CCD in response to a counting enable signal CNT_EN during the first to fourth sub-periods SP1 to SP4 of a readout period. The code value of the counting code CCD may increase over time. The counting code CCD may include m-bit data b[m-1:0]. The m-bit data b[m-1:0] of the counting code CCD may be simultaneously provided to the latch LAT.

The operation of the first counter CB1 is substantially the same as the operation of the counter circuit 170 described with reference to FIGS. 15 and 16. The counter circuit 170 may generate the HCG pixel value and the LCG pixel value based on the counting code CCD including the n-bit data b[n-1:0], and the first counter CB1 may generate lower m-bit data of each of the HCG pixel value and the LCG pixel value based on the counting code CCD including the n-bit data b[n-1:0]. A detailed description of the first counter CB1 will be omitted.

The latch LAT may provide at least one bit data, for example, m-th bit data b [m-1], of the m-bit data b[m-1:0] of the counting code CCD to the ripple counter RCNT. Each of the m-bit data b [m-1:0] of the counting code CCD may be toggled at a predetermined frequency, and the toggling frequency of LSB data, that is, first bit data b[0], may be the highest and the toggling frequency of the m-bit data b [m-1:0] may be the lowest. The latch LAT may provide m-th bit data b[m-1] of the counting code CCD to the ripple counter RCNT until when the comparison signal SCP transitions from logic high to logic low.

The second counter CB2 may generate the upper (n-m)-bit data of each of the HCG pixel value and the LCG pixel value based on the m-th bit data b[m-1] of the counting code CCD received from the latch LAT.

The ripple counter RCNT may generate a counting value by counting the number of toggles of the m-th bit data b[m-1] of the counting code CCD. The counting value may include (n-m)-bit counting data Cb[n-1:m]. In an embodiment, the ripple counter RCNT may be implemented as a set-reset (SR) flip-flop, that is, a flip-flop having an SR function.

Referring to FIG. 17, the ripple counter RCNT may perform up-counting based on the m-th bit data b[m] received according to each of the first to fourth comparison signals SCP1 to SCP4 during the first to fourth sub-periods SP1 to SP4, and accordingly, generate first to fourth counting values including the (n-m)-bit counting data Cb[n-1:m], respectively.

The ripple counter RCNT may generate a first counting value, for example, the LCG reset value $RST_L$ with respect to the LCG reset signal during the first sub-period SP1. The ripple counter RCNT may perform bit-wise inversion (BWI) on the LCG reset value $RST_L$. Through this, the negative value $-RST_L$ of the LCG reset value $RST_L$ (hereinafter referred to as a negative LCG reset value) may be generated, and the negative LCG reset value $-RST_L$ may be stored in the third memory MEM3.

The ripple counter RCNT may be reset, and may generate a second counting value, for example, the HCG reset value $RST_H$, with respect to the HCG reset signal during the second sub-period SP2. The ripple counter RCNT may perform BWI on the HCG reset value $RST_H$ to generate a negative value $-RST_H$ of the HCG reset value $RST_H$ (hereinafter referred to as a negative HCG reset value). The negative HCG reset value $-RST_H$ may be stored in the fourth memory MEM4.

The ripple counter RCNT may generate a third counting value during the third sub-period SP3. The ripple counter RCNT may perform up-counting from the negative HCG reset value $-RST_H$ and generate a summation value $SIG_H-RST_H$ of the HCG signal value $SIG_H$ and the negative HCG reset value $-RST_H$ as the third counting value. The third counting value may be the HCG pixel value $PXD_H$ and stored in the fourth memory MEM4, and then output as the output data Dout when a first output switch SWO1 is turned on.

During the fourth sub-period SP4, the second selector SLT2 may provide the negative LCG reset value $-RST_L$ stored in the third memory MEM3 to the ripple counter RCNT. The ripple counter RCNT may perform up-counting from the negative LCG reset value $-RST_L$ and generate a summation value $SIG_L-RST_H$ of the LCG signal value $SIG_L$ and the negative LCG signal value $-RST_L$ as a fourth counting value. The fourth counting value may be the LCG pixel value $PXD_L$, stored in the fourth memory MEM4, and then output as the output data Dout when a second output switch SWO2 is turned on.

The first output switch SWO1 may be turned on simultaneously with the second output switch SWO2, and the HCG pixel value $PXD_H$ and the LCG pixel value $PXD_L$ output from the first counter CB1 may constitute lower n-bit data of the output data Dout, and the HCG pixel value $PXD_H$ and the LCG pixel value $PXD_L$ output from the second counter CB2 may constitute upper (m-n)-bit data of the output data Dout.

As described above, the counter circuit 170b according to an embodiment of the disclosure may generate lower m-bit data of a pixel value based on a latch operation of the counting code CCD, and generate upper (n-m)-bit data of pixel values based on an up-counting operation, thereby generating pixel values including n-bit data, for example, the HCG pixel value $PXD_H$ and the LCG pixel value $PXD_L$.

Figure 18:
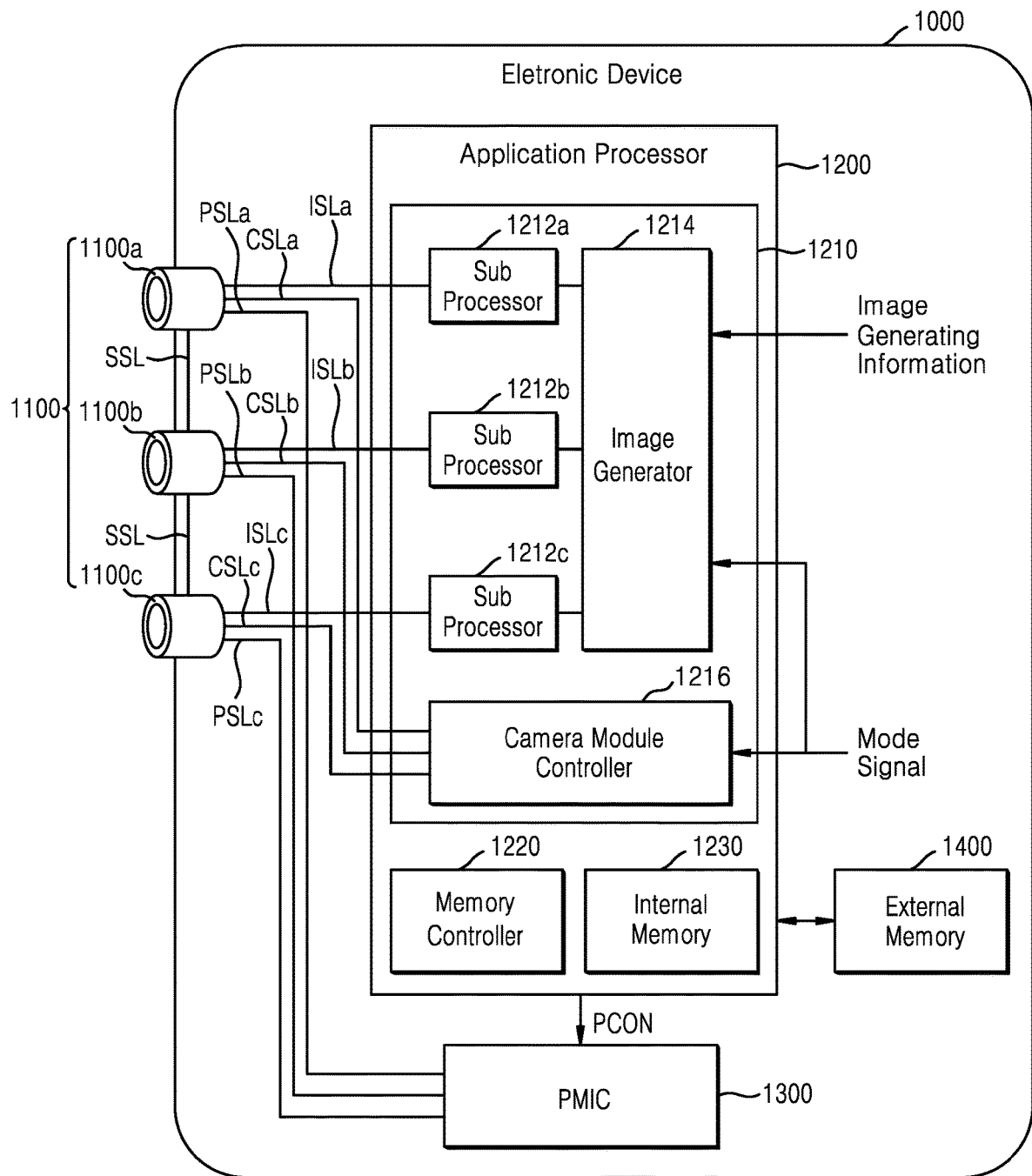
FIGS. 18 and 19 are block diagrams of an electronic device including multi-camera modules.
Figure 19:
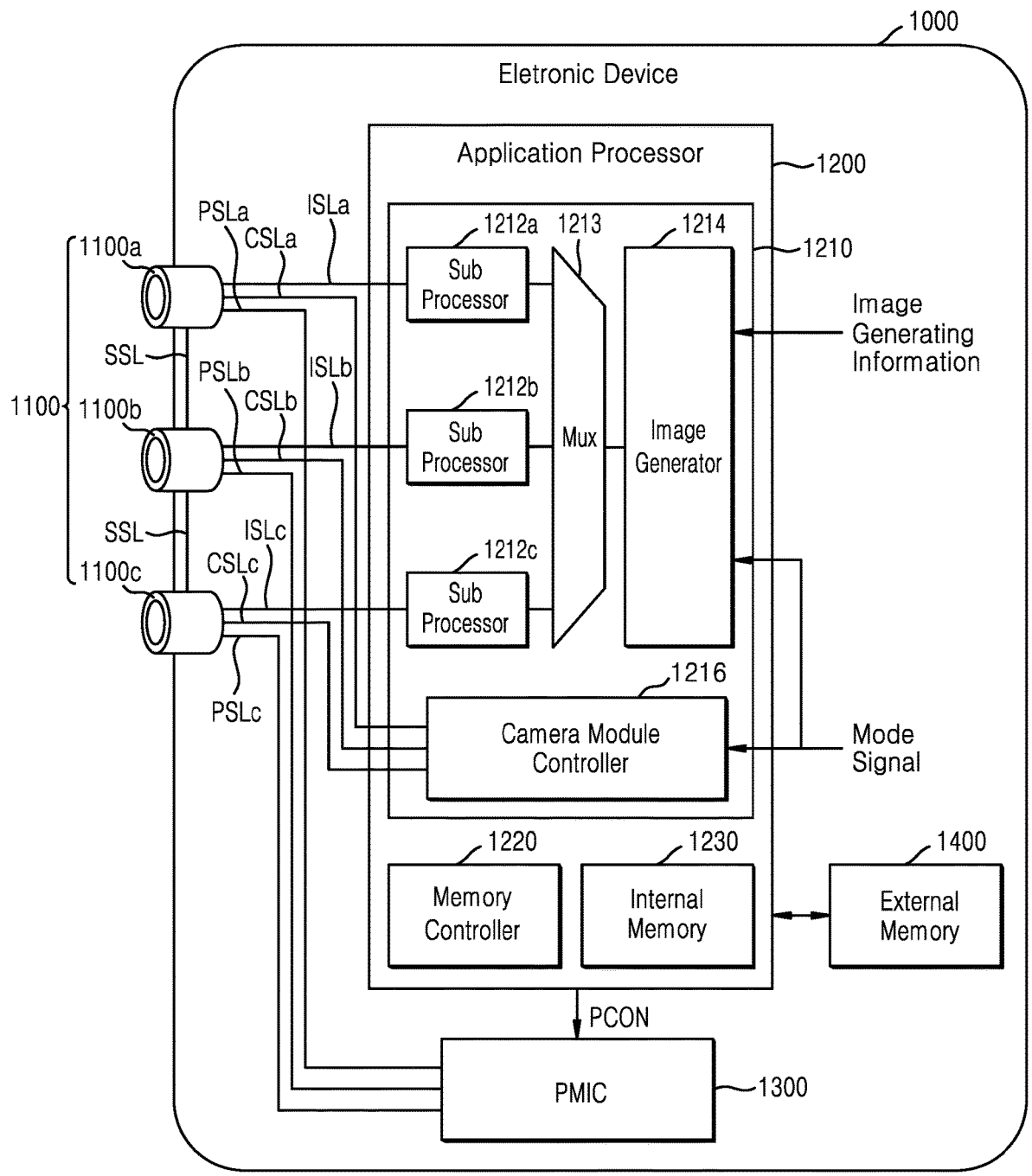
Figure 20:
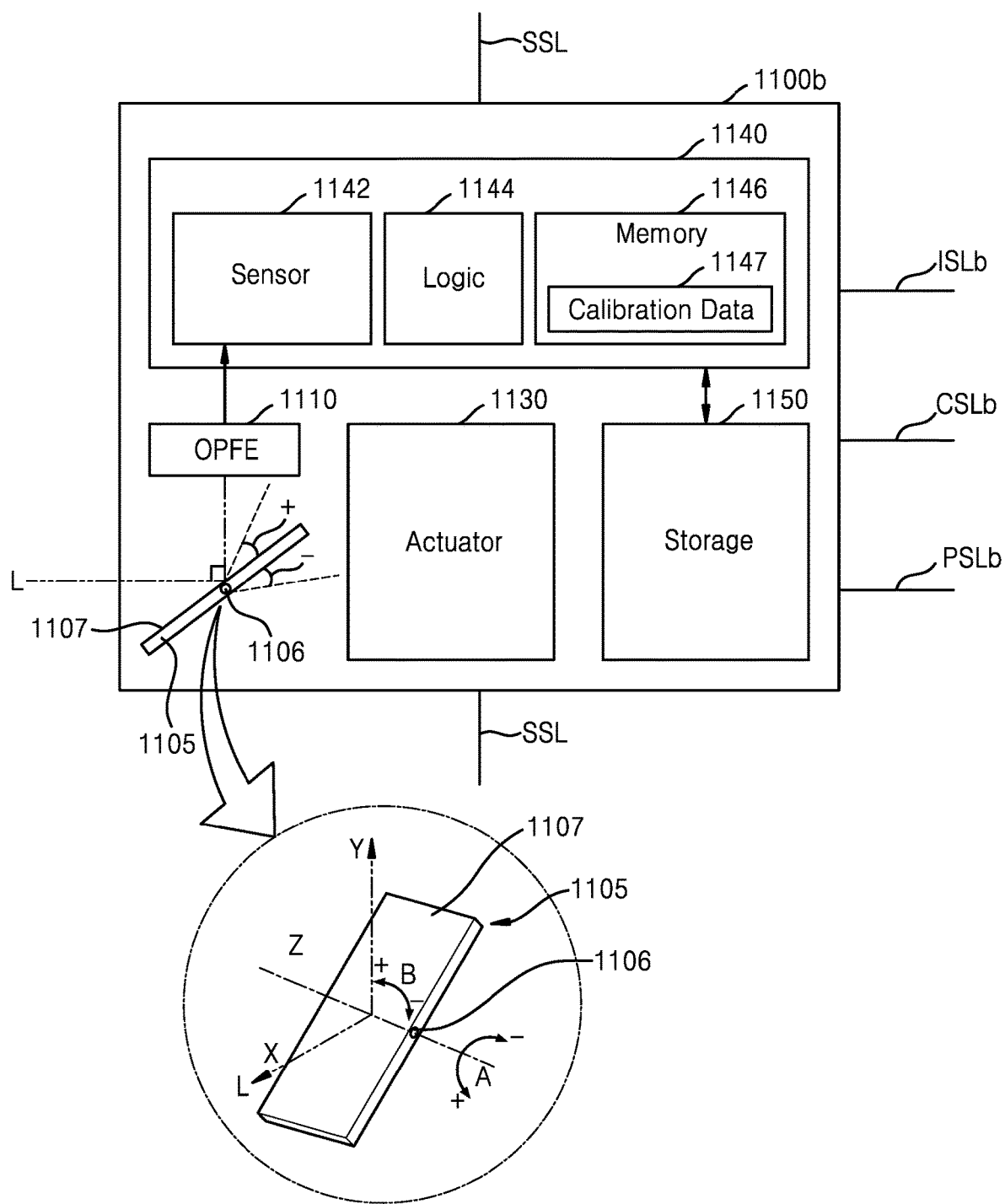
FIG. 20 is a detailed block diagram of the camera module of FIG. 18.

FIGS. 18 and 19 are block diagrams of an electronic device 1000 including multi-camera modules 1100a, 1100b, and 1100c. FIG. 20 is a detailed block diagram of the camera module 1100b of FIG. 18.

Referring to FIG. 18, the electronic device 1000 may include a camera module group 1100, an application processor 1200, a power management integrated circuit (PMIC) 1300, and an external memory 1400.

The camera module group 1100 may include the plurality of camera modules 1100a, 1100b, and 1100c. Although an embodiment in which the three camera modules 1100a, 1100b, and 1100c are arranged is illustrated in the drawings, the embodiments are not limited thereto. In some embodiments, the camera module group 1100 may be modified to include only two camera modules or k camera modules (k is a natural number of 4 or more).

Hereinafter, a detailed configuration of the camera module 1100b will be described in more detail with reference to FIG. 20, but the following description may be equally applied to the other camera modules 1100a and 1100c according to an embodiment.

Referring to FIG. 20, the camera module 1100b may include a prism 1105, an optical path folding element (OPFE) 1110, an actuator 1130, an image sensing device 1140, and a storage 1150.

The prism 1105 may include a reflective surface 1107 of a light reflecting material to deform a path of light L incident from the outside.

In some embodiments, the prism 1105 may change the path of the light L incident in a first direction X to a second direction Y perpendicular to the first direction X. In addition, the prism 1105 may rotate the reflective surface 1107 of the light reflecting material in the A direction with respect to a central axis 1106 or rotate the central axis 1106 in the B direction to change the path of the light L incident in the first direction X to the second direction Y perpendicular to the first direction X. In this case, the OPFE 1110 may also move in a third direction Z perpendicular to the first direction X and the second direction Y.

In some embodiments, as shown, the maximum rotation angle of the prism 1105 in the A direction may be equal to or less than 15 degrees in the positive (+) A direction, and may be greater than 15 degrees in the negative (−) A direction, but the embodiments are not limited thereto.

In some embodiments, the prism 1105 may move between 20 degrees in the plus (+) or minus (−) B direction, or between 10 degrees and 20 degrees, or between 15 degrees and 20 degrees, where the angle of movement may be the same as the angle of movement in the plus (+) or minus (−) B direction or may be almost similar to the angle of movement in the range between 1 degree.

In some embodiments, the prism 1105 may move the reflective surface 1107 of the light reflecting material in a third direction (e.g., the Z direction) parallel to a direction in which the central axis 1106 extends.

In some embodiments, the camera module 1100b may include two or more prisms, through which the path of the light L incident in the first direction X may variously change to the second direction Y perpendicular to the first direction X, again the first direction X or the third direction Z, and again the second direction Y.

The OPFE 1110 may include, for example, an optical lens including m (where m is a natural number) groups. The m lenses may move in the second direction Y to change an optical zoom ratio of the camera module 1100b. For example, when the basic optical zoom ratio of the camera module 1100b is Z, and when the m optical lenses included in the OPFE 1110 move, the optical zoom ratio of the camera module 1100b may change to 3Z, 5Z or an optical zoom ratio greater than 5Z.

The actuator 1130 may move the OPFE 1110 or the optical lens to a specific position. For example, the actuator 1130 may adjust the position of the optical lens such that an image sensor 1142 is positioned at a focal length of the optical lens for accurate sensing.

The image sensing device 1140 may include the image sensor 1142, a control logic 1144, and a memory 1146. The image sensor 1142 may sense an image of a sensing target using the light L provided through the optical lens. At least one of the image sensor 100 and components thereof described with reference to FIGS. 1 to 17, for example, the pixel PX (in FIG. 3) supporting a dual conversion gain, the CDS circuit 160a (in FIG. 4), the bias current controller BCC (in FIG. 11) and the counter circuit 170a (in FIG. 14) or 170b (in FIG. 16) may be applied to the image sensor 1142. The image sensor 1142 may generate image data having a high dynamic range by merging HCG image data and LCG image data.

The control logic 1144 may control the overall operation of the camera module 1100b and process a sensed image. For example, the control logic 1144 may control the operation of the camera module 1100b according to a control signal provided through a control signal line CSLb and extract image data (e.g., a person's face, arms, legs, etc. in the image) corresponding to a specific image from the sensed image.

In some embodiments, the control logic 1144 may perform image processing, such as encoding and noise reduction, of the sensed image.

The memory 1146 may store information, such as calibration data 1147, to be used in the operation of the camera module 1100b. The calibration data 1147 may be information that is used when the camera module 1100b generates image data using the light L provided from the outside, and may include, for example, information about a degree of rotation, information about a focal length, information about an optical axis, and the like. When the camera module 1100b is implemented in the form of a multi-state camera having a focal length changing according to the position of the optical lens, the calibration data 1147 may include information related to a focal length value for each position (or each state) of the optical lens and auto focusing.

The storage 1150 may store image data sensed through the image sensor 1142. The storage 1150 may be disposed outside the image sensing device 1140 and may be implemented to be stacked with a sensor chip constituting the image sensing device 1140. In some embodiments, the image sensor 1142 may be configured as a first chip, and the control logic 1144, the storage 1150, and the memory 1146 may be configured as a second chip such that the storage 1150 may be implemented to be stacked with the first and the second chips.

In some embodiments, the storage 1150 may be implemented as an electrically erasable programmable read-only memory (EEPROM), but the embodiments are not limited thereto. In some embodiments, the image sensor 1142 may be configured as a pixel array, and the control logic 1144 may include an analog to digital converter and an image signal processor processing the sensed image.

Referring to FIGS. 18 and 20 together, in some embodiments, each of the plurality of camera modules 1100a, 1100b, and 1100c may include the actuator 1130. Accordingly, each of the plurality of camera modules 1100a, 1100b, and 1100c may include the same or different calibration data 1147 according to the operation of the actuator 1130 included therein.

In some embodiments, one camera module (e.g., 1100b) among the plurality of camera modules 1100a, 1100b, and 1100c may be a folded lens type camera module including the prism 1105 and OPFE 1110 described above and, and the remaining camera modules (e.g., 1100a and 1100c) may be vertical type camera modules that do not include the prism 1105 and the OPFE 1110, but the embodiments are not limited thereto.

In some embodiments, one camera module (e.g., 1100c) among the plurality of camera modules 1100a, 1100b, and 1100c may be a vertical type depth camera that extracts depth information using, for example, infrared ray (IR). In this case, the application processor 1200 may merge image data provided from the depth camera with image data provided from another camera module (e.g., 1100a or 1100b) to generate a 3D depth image.

In some embodiments, at least two camera modules (e.g., 1100a and 1100b) among the plurality of camera modules 1100a, 1100b, and 1100c may have different observation fields of view. For example, the camera module 1100a may be an ultrawide camera, the camera module 1100b may be a wide camera, and the camera module 1100c may be a tele camera, but the embodiments are not limited thereto. In this case, for example, the optical lenses of at least two camera modules (e.g., 1100a and 1100b) among the plurality of camera modules 1100a, 1100b, and 1100c may be different from each other, but the embodiments are not limited thereto.

Also, in some embodiments, the plurality of camera modules 1100a, 1100b, and 1100c may have different fields of view. In this case, the optical lenses included in the plurality of camera modules 1100a, 1100b, and 1100c may also be different from each other, but the embodiments are not limited thereto.

In some embodiments, the plurality of camera modules 1100a, 1100b, and 1100c may be physically separated from each other and disposed. That is, a sensing area of one image sensor 1142 is not divided and used by the plurality of camera modules 1100a, 1100b, and 1100c, but an independent image sensor 1142 may be disposed in each of the plurality of camera modules 1100a, 1100b, and 1100c.

Referring back to FIG. 18, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 may be implemented as a semiconductor chip separately from the plurality of camera modules 1100a, 1100b, and 1100c.

The image processing device 1210 may include a plurality of sub-image processors 1212a, 1212b, and 1212c, an image generator 1214, and a camera module controller 1216.

The number of the plurality of sub-image processors 1212a, 1212b, and 1212c included in the image processing device 1210 may correspond to the number of the plurality of camera modules 1100a, 1100b, and 1100c.

Image data generated from the camera module 1100a may be provided to the sub-image processor 1212a through an image signal line ISLa, image data generated from the camera module 1100b may be provided to the sub-image processor 1212b through an image signal line ISLb, and image data generated from the camera module 1100c may be provided to the sub-image processor 1212c through an image signal line ISLc. Such image data transmission may be performed using, for example, a camera serial interface (CSI) based on a Mobile Industry Processor Interface (MIPI), but is not limited thereto.

In some embodiments, one sub-image processor may be disposed to correspond to a plurality of camera modules. For example, the sub-image processor 1212a and the sub-image processor 1212c are not implemented separately from each other as shown, but may be integrated and implemented as a sub-image processor and the image data provided from the camera module 1100a and the camera module 1100c may be selected through a selection element (e.g., a multiplexer), etc., and then provided to the integrated sub-image processor. In this case, the sub-image processor 1212b may not be integrated, and may receive the image data from the camera module 1100b.

Further, in some embodiments, the image data generated from the camera module 1100a may be provided to the sub-image processor 1212a through the image signal line ISLa, the image data generated from the camera module 1100b may be provided to the sub-image processor 1212b through the image signal line ISLb, and the image data generated from the camera module 1100c may be provided to the sub-image processor 1212c through the image signal line ISLc. In addition, while the image data processed by the sub-image processor 1212b may be directly provided to the image generator 1214, any one of the image data processed by the sub-image processor 1212a and the image data processed by the sub-image processor 1212c may be selected through the selection element (e.g., a multiplexer), etc., and then provided to the image generator 1214.

Each of the sub-image processors 1212a, 1212b, and 1212c may respectively perform image processing such as bad pixel correction, 3A adjustment (auto-focus correction, auto-white balance, and auto-exposure), noise reduction, sharpening, gamma control, remosaic, etc. on the image data provided from the camera modules 1100a, 1100b, and 1100c.

In some embodiments, remosaic signal processing may be performed by each of the camera modules 1100a, 1100b, and 1100c and then respectively provided to the sub-image processors 1212a, 1212b, and 1212c.

The image data processed by each of the sub-image processors 1212a, 1212b, and 1212c may be provided to the image generator 1214. The image generator 1214 may generate an output image using the image data provided from each of the sub-image processors 1212a, 1212b, and 1212c according to image generating information or a mode signal.

Specifically, the image generator 1214 may generate the output image by merging at least some of the image data provided from the sub-image processors 1212a, 1212b, and 1212c according to the image generating information or the mode signal. Also, the image generator 1214 may generate the output image by selecting any one of the image data provided from the sub-image processors 1212a, 1212b, and 1212c according to the image generating information or the mode signal.

In some embodiments, the image generating information may include a zoom signal or a zoom factor. Further, in some embodiments, the mode signal may be, for example, a signal based on a mode selected from a user.

When the image generating information is the zoom signal (the zoom factor), and the camera modules 1100a, 1100b, and 1100c have different observation fields of view, the image generator 1214 may perform different operations according to the type of the zoom signal. For example, when the zoom signal is a first signal, among the image data output from the sub-image processor 1212a and the image data output from the sub-image processor 1212c, the image generator 1214 may generate the output image using the image data output from the sub-image processor 1212a and the image data output from the sub-image processor 1212b. When the zoom signal is a second signal different from the first signal, among the image data output from the sub-image processor 1212a and the image data output from the sub-image processor 1212c, the image generator 1214 may generate the output image using the image data output from the sub-image processor 1212c and the image data output from the sub-image processor 1212b. When the zoom signal is a third signal different from the first and second signals, the image generator 1214 does not perform such image data merging but select any one of the image data output from the sub-image processors 1212a, 1212b, and 1212c and generate the output image. However, the embodiments are not limited thereto, and a method of processing image data may be modified and implemented as needed.

Referring to FIG. 19, in some embodiments, the image processing device 1210 may further include a selector 1213 that selects outputs of the sub-image processors 1212a, 1212b, and 1212c and transmits the outputs to the image generator 1214.

In this case, the selector 1213 may perform different operations according to a zoom signal or a zoom factor. For example, when the zoom signal is a fourth signal (e.g., the zoom magnification is a first magnification), the selector 1213 may select any one of the outputs of the sub-image processors 1212a, 1212b, and 1212c and send the selected output to the image generator 1214.

In addition, when the zoom signal is a fifth signal different from the fourth signal (for example, the zoom magnification is a second magnification), the selector 1213 may sequentially send p outputs (p is a natural number of 2 or more) among the outputs of the sub-image processors 1212a, 1212b, and 1212c to the image generator 1214. For example, the selector 1213 may sequentially send the outputs of the sub-image processor 1212b and the sub-image processor 1212c to the image generator 1214. Also, the selector 1213 may sequentially send the outputs of the sub-image processor 1212a and the sub-image processor 1212b to the image generator 1214. The image generator 1214 may generate one output image by merging the p outputs sequentially provided.

Here, image processing such as demosaic, video/preview resolution size down scaling, gamma correction, high dynamic range (HDR), etc. may be previously performed by the sub-image processors 1212a, 1212b, and 1212c and then the processed image data is sent to the image generator 1214. Accordingly, even if the processed image data is provided to the image generator 1214 via one signal line through the selector 1213, the image merging operation of the image generator 1214 may be performed at high speed.

In some embodiments, the image generator 1214 may receive a plurality of image data having different exposure times from at least one of the plurality of sub-image processors 1212a, 1212b, and 1212c, and perform HDR on the plurality of image data, thereby generating merged image data with an increased dynamic range.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through control signal lines CSLa, CSLb, and CSLc separated from each other.

Any one of the plurality of camera modules 1100a, 1100b, 1100c may be designated as a master camera (e.g., 1100b) according to the image generating information including the zoom signal or the mode signal, and the remaining camera modules (e.g., 1100a and 1100c) may be designated as slave cameras. Such information may be included in the control signal and provided to the corresponding camera modules 1100a, 1100b, and 1100c through the control signal lines CSLa, CSLb, and CSLc separated from each other.

Camera modules operating as a master camera and a slave camera may change according to a zoom factor or an operation mode signal. For example, when the field of view of the camera module 1100a is wider than that of the camera module 1100b and the zoom factor indicates a low zoom magnification, the camera module 1100a may operate as the master, and the camera module 1100b may operate as a slave. To the contrary, when the zoom factor indicates a high zoom magnification, the camera module 1100b may operate as the master camera and the camera module 1100a may operate as the slave camera.

In some embodiments, the control signal provided from the camera module controller 1216 to each of the camera modules 1100a, 1100b, and 1100c may include a sync enable signal. For example, when the camera module 1100b is the master camera and the camera modules 1100a and 1100c are the slave cameras, the camera module controller 1216 may transmit the sync enable signal to the camera module 1100b. The camera module 1100b that receives the sync enable signal may generate a sync signal based on the sync enable signal and provide the generated sync signal to the camera modules 1100a and 1100c through a sync signal line SSL. The camera module 1100b and the camera modules 1100a and 1100c may be synchronized with such a sync signal to transmit the image data to the application processor 1200.

In some embodiments, the control signal provided from the camera module controller 1216 to the plurality of camera modules 1100a, 1100b, and 1100c may include mode information according to the mode signal. Based on the mode information, the plurality of camera modules 1100a, 1100b, and 1100c may operate in a first operation mode and a second operation mode in relation to a sensing speed.

The plurality of camera modules 1100a, 1100b, and 1100c may generate an image signal at a first speed (e.g., generate the image signal at a first frame rate) in the first operation mode, encode the image signal at a second speed (e.g., encode the image signal at a second frame rate higher than the first frame rate) higher than the first speed, and transmit the encoded image signal to the application processor 1200. In this case, the second speed may be 30 times or less of the first speed.

The application processor 1200 may store the received image signal, that is, the encoded image signal, in the internal memory 1230 in the application processor 1200 or in the storage 1400 outside the application processor 1200, and then, read and decode the encoded image signal from the internal memory 1230 or the external storage 1400, and display image data generated based on the decoded image signal. For example, a corresponding sub-image processor among the plurality of sub-image processors 1212a, 1212b, and 1212c of the image processing device 1210 may perform decoding and also perform image processing on the decoded image signal.

The plurality of camera modules 1100a, 1100b, and 1100c may generate an image signal at a third speed lower than the first speed (e.g., generate the image signal of a third frame rate lower than the first frame rate) in the second operation mode and transmit the image signal to the application processor 1200. The image signal provided to the application processor 1200 may be an unencoded signal. The application processor 1200 may perform image processing on the received image signal or may store the image signal in the memory 1230 or the external storage 1400.

The PMIC 1300 may supply power, such as a power voltage, to each of the plurality of camera modules 1100a, 1100b, and 1100c. For example, the PMIC 1300 may supply first power to the camera module 1100a through a power signal line PSLa, supply second power to the camera module 1100b through a power signal line PSLb, and supply third power to the camera module 1100c through a power signal line PSLc under the control of the application processor 1200.

The PMIC 1300 may generate power corresponding to each of the plurality of camera modules 1100a, 1100b, and 1100c in response to a power control signal PCON from the application processor 1200, and may also adjust a power level. The power control signal PCON may include a power adjustment signal for each operation mode of the plurality of camera modules 1100a, 1100b, and 1100c. For example, the operation mode may include a low power mode, and in this case, the power control signal PCON may include information about a camera module operating in a low power mode and a set power level. Levels of powers provided to the plurality of camera modules 1100a, 1100b, and 1100c may be the same as or different from each other. Also, the power level may be dynamically changed.

While the disclosure has been particularly shown and described with reference to embodiments thereof, it will be understood that various changes in form and details may be made therein without departing from the spirit and scope of the following claims.

What is claimed is:

1. An image sensor comprising:
a pixel configured to operate in a high conversion gain (HCG) mode and a low conversion gain (LCG) mode during a readout period, and sequentially output, as a pixel voltage, an LCG reset signal, an HCG reset signal, an HCG image signal, and an LCG image signal; and
a correlated double sampling (CDS) circuit configured to generate a comparison signal based on a ramp signal and the pixel voltage received from the pixel,
wherein the CDS circuit comprises a comparator configured to:
receive the pixel voltage through a first input node, receive the ramp signal through a second input node based on the LCG reset signal or the LCG image signal being received as the pixel voltage, and receive the ramp signal through a third input node based on the HCG reset signal or the HCG image signal being received as the pixel voltage; and
compare the ramp signal to the pixel voltage, and output the comparison signal corresponding to a comparison result.

2. The image sensor of claim 1, wherein the CDS circuit further comprises:
a first capacitor having a first terminal electrically connected to the first input node and a second terminal to which the pixel voltage is applied;
a second capacitor having a first terminal electrically connected to the second input node and a second terminal to which the ramp signal is applied; and a third capacitor having a first terminal electrically connected to the third input node and a second terminal to which the ramp signal is applied.

3. The image sensor of claim 1, wherein the comparator further comprises:
a current source configured to provide a bias current;
an input stage comprising a first transistor, a second transistor, and a third transistor, wherein a first terminal of each of the first transistor, the second transistor, and the third transistor is electrically connected to the current source, and gate terminals of the first transistor and the second transistor, and the third transistor are respectively connected to the first input node, the second input node, and the third input node;
an output stage comprising a fourth transistor and a fifth transistor, wherein a power voltage is applied to a first terminal of each of the fourth transistor and the fifth transistor, a second terminal of the fourth transistor is electrically connected to a comparison node, a second terminal of the fifth transistor is connected to an output node, and a gate terminal of the fourth transistor and a gate terminal of the fifth transistor are connected to each other; and
a switch configured to control respective connections among the input stage, the output stage, the comparison node, and the output node.

4. The image sensor of claim 3, wherein the switch comprises:
a first switch provided between the first input node and the output node;
a second switch provided between a second terminal of the second transistor and the comparison node;
a third switch provided between a second terminal of the third transistor and the comparison node;
a fourth switch provided between the second input node and the comparison node;
a fifth switch provided between the third input node and the comparison node;
a sixth switch provided between the comparison node and an intermediate node of the output stage; and
a seventh switch provided between the output node and the intermediate node of the output stage.

5. The image sensor of claim 4, wherein the comparator is further configured to perform a first auto-zero operation in which the first switch, the third switch, the fourth switch, and the sixth switch are turned on based on the LCG reset signal, having a first voltage level, being received as the pixel voltage, wherein the first input node, the second input node, the comparison node, and the output node have a first auto-zero voltage level by the first auto-zero operation.

6. The image sensor of claim 5, wherein the comparator is further configured to, after the first auto-zero operation, turn off the third switch and the fourth switch, and compare the LCG reset signal to the ramp signal.

7. The image sensor of claim 5, wherein the comparator is further configured to perform a second auto-zero operation in which the second switch, the fifth switch, and the seventh switch are turned on based on the LCG reset signal, having a second voltage level, being received as the pixel voltage, wherein the first input node, the third input node, and the comparison node have a second auto-zero voltage level by the second auto-zero operation, and
wherein a difference between the first auto-zero voltage level and the second auto-zero voltage level is equal to a difference between the first voltage level and the second voltage level.

8. The image sensor of claim 7, wherein the comparator is further configured to, after the second auto-zero operation, turn off the fifth switch and the seventh switch, turn on the sixth switch, compare the HCG reset signal to the ramp signal, and compare the HCG image signal to the ramp signal.

9. The image sensor of claim 7, wherein the comparator is further configured to, after comparing the HCG image signal to the ramp signal, turn off the second switch, turn on the first switch, and compare the LCG image signal to the ramp signal.

10. The image sensor of claim 1, further comprising:
a counting code generator configured to generate a counting code having an increasing code value; and
a counter circuit configured to generate an HCG pixel value and an LCG pixel value based on the counting code received from the counting code generator and the comparison signal received from the CDS circuit,
wherein the counter circuit comprises:
a latch configured to latch the code value of the counting code at a time when a level of the comparison signal transitions, and output the code value as a counting value with respect to the comparison signal;
a first memory configured to store a first counting value output from the latch;
a second memory configured to store a second counting value output from the latch after the first counting value is output;
a selector configured to select one of the first counting value and the second counting value; and
a calculator configured to perform calculation on a third counting value or a fourth counting value output from the latch and the first counting value or the second counting value selected by the selector.

11. The image sensor of claim 10, wherein the latch is further configured to:
sequentially receive, as the comparison signal, a first comparison signal corresponding to the LCG reset signal, a second comparison signal corresponding to the HCG reset signal, a third comparison signal corresponding to the HCG image signal, and a fourth comparison signal corresponding to the LCG image signal, and
sequentially output the first counting value according to the first comparison signal, the second counting value according to the second comparison signal, the third counting value according to the third comparison signal, and the fourth counting value according to the fourth comparison signal.

12. The image sensor of claim 11, wherein the selector is further configured to, when the third counting value is output from the latch to the calculator, select and provide the second counting value to the calculator, and
when the fourth counting value is output from the latch to the calculator, select and provide the first counting value to the calculator.

13. The image sensor of claim 11, wherein the calculator comprises a 1-bit adder and is configured to perform a 1-bit serial operation on the third counting value and the second counting value, and perform the 1-bit serial operation on the fourth counting value and the first counting value.

14. The image sensor of claim 11, wherein the counter circuit further comprises a flip-flop configured to store a carry output from the calculator and provide the carry to the calculator in a next operation.

15. The image sensor of claim 1, wherein the pixel comprises:
- a photoelectric conversion element configured to convert a received optical signal into an electric charge;
- a floating diffusion node electrically connected to the photoelectric conversion element and configured to store the electric charge;
- a driving transistor configured to output a voltage corresponding to a voltage of the floating diffusion node; and
- a gain control transistor configured to be turned on or off in response to a conversion gain control signal,
- wherein the pixel is further configured to operate in the LCG mode based on the gain control transistor being turned on, and operate in the HCG mode based on the gain control transistor being turned off.

* * * * *